United States Patent [19]
Saito et al.

[11] Patent Number: 5,593,939
[45] Date of Patent: Jan. 14, 1997

[54] THERMAL TRANSFER IMAGE RECEIVING SHEET, PRODUCTION PROCESS THEREFOR AND THERMAL TRANSFER SHEET

[75] Inventors: Hitoshi Saito; Kazunobu Imoto; Takeshi Ueno; Katsuyuki Oshima; Mineo Yamauchi; Hiroshi Eguchi; Hideaki Sato; Hideo Fujimura; Mikio Asajima, all of Tokyo, Japan

[73] Assignee: Dai Nippon Printing Co., Ltd., Japan

[21] Appl. No.: 281,453

[22] Filed: Jul. 27, 1994

Related U.S. Application Data

[62] Division of Ser. No. 755,116, Sep. 5, 1991, Pat. No. 5,356,853.

[30] Foreign Application Priority Data

| Sep. 7, 1990 | [JP] | Japan | 2-235618 |
| Sep. 27, 1990 | [JP] | Japan | 2-255162 |
| Sep. 27, 1990 | [JP] | Japan | 2-255163 |
| Sep. 27, 1990 | [JP] | Japan | 2-255167 |
| Oct. 4, 1990 | [JP] | Japan | 2-265105 |
| Oct. 4, 1990 | [JP] | Japan | 2-265110 |
| Nov. 2, 1990 | [JP] | Japan | 2-297597 |
| Jan. 21, 1991 | [JP] | Japan | 3-19192 |
| Mar. 1, 1991 | [JP] | Japan | 3-57703 |

[51] Int. Cl.$^6$ ............................. B41M 5/035; B41M 5/38

[52] U.S. Cl. .................. 503/227; 428/195; 428/304.4; 428/409; 428/913; 428/914

[58] Field of Search ........................ 428/195, 409, 428/913, 914, 304.4; 503/227; 8/471

[56] References Cited

FOREIGN PATENT DOCUMENTS

| 2-26788 | 1/1990 | Japan | 503/227 |
| 2-223483 | 9/1990 | Japan | 503/227 |

*Primary Examiner*—B. Hamilton Hess
*Attorney, Agent, or Firm*—Ladas & Parry

[57] ABSTRACT

A thermal transfer image receiving sheet includes substrate sheet and a dye receptor layer disposed on at least one surface side of the substrate sheet, wherein the dye receptor layer has been formed on the substrate sheet by superposing the substrate sheet onto a receptor layer transfer film comprising a substrate film and the dye receptor layer disposed on one surface side thereof which is peelable from the substrate film, so that the receptor layer transfer film is bonded to the substrate sheet to form a laminate, and peeling the substrate film from the laminate.

The thermal transfer sheet also includes a substrate film, an intermediate layer disposed on the substrate film, and a dye layer disposed on the substrate film by the medium of the intermediate layer, wherein the dye layer comprises a dye and a binder resin, and at least one of the intermediate layer and the dye layer contains bubbles.

6 Claims, 2 Drawing Sheets

FIG.1
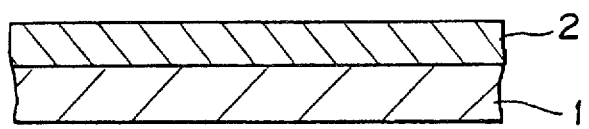
FIG.2
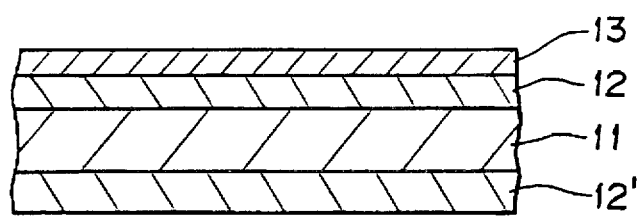
FIG.3(a)  FIG.3(b)  FIG.3(c)
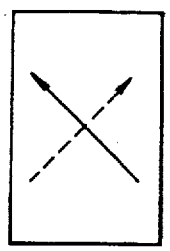 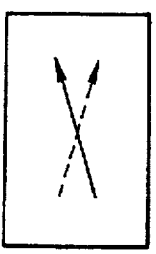 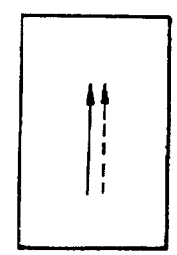

THERMAL TRANSFER IMAGE RECEIVING SHEET, PRODUCTION PROCESS THEREFOR AND THERMAL TRANSFER SHEET

This is a divisional of application Ser. No. 07/755,116 filed on Sept. 5, 1991, now U.S. Pat. No. 5,356,853.

BACKGROUND OF THE INVENTION

The present invention relates to a thermal transfer image receiving sheet and a process for producing such a sheet, and more particularly to a thermal transfer image receiving sheet having a dye receptor layer which is capable of forming a good image by using a thermal transfer system.

The present invention also relates to a thermal transfer sheet which may suitably be used in combination with the above thermal transfer image receiving sheet, is excellent in dye migration property at the time of thermal transfer operation, and is capable of providing a good image having no white defect (or white dropout), etc.

Heretofore, various thermal transfer methods have been known. Among these, there has been proposed a method wherein a sublimable dye (or subliming dye) is used as a recording agent, and is carried on a substrate film such as paper and plastic film to obtain a thermal transfer film, and various full color images are formed on an image receiving sheet such as paper and plastic film having thereon a dye receptor layer, by using the resultant thermal transfer film.

In such a case, a thermal head of a printer is used as heating means so that a large number of color dots of three or four colors are transferred to the image receiving sheet under heating in a very short period of time. As a result, a full color image of an original is reproduced by using the multi-color color dots.

The thus formed images are very clear and are excellent in transparency, since the dyes are used therein as a colorant. Accordingly, these images are excellent in half tone reproducibility and gradation characteristic, and are substantially the same as the images formed by the conventional offset printing and gravure printing. Further, when the above image forming method is used, there can be formed images of high quality which are comparable to full color photographic images.

As the thermal transfer image receiving sheet to be used in the above sublimation type thermal transfer system, there has been used one comprising a substrate sheet and a dye receptor layer disposed thereon. However, since the image receiving sheet is heated at the time of the transfer operation, it causes considerable curl. In addition, in a case where such an image receiving sheet is left standing at a higher or lower temperature before it is used for the thermal transfer operation, it also causes curl, and cannot be fed to a printer in some cases.

As a method for solving such a problem of curl production, there have been proposed a method wherein a back coating layer is bonded to a surface of a substrate sheet reverse to the surface thereof on which a dye receptor layer is formed (Japanese Laid Open Patent Application (JP A, KOKAI) No. 214484/1988), a method wherein an ionization radiation curing adhesive is disposed between a substrate sheet and a dye receptor layer (Japanese Laid Open Patent Application No. 24794/1989), etc. In these methods, however, the problem of curl production has not sufficiently been solved yet.

In the above thermal transfer method, for the purpose of improving the migrating property of the dye, both of the dye layer and dye receptor layer are caused to have a smooth surface so that the thermal transfer sheet may closely contacts the thermal transfer image receiving sheet, and a release agent such as silicone oil is contained in or applied onto the dye layer and/or dye receptor layer so that these layers are not bonded to each other by heat fusion after the printing operation.

Accordingly, the resultant transferred image has excellent surface gloss; but is not suitable in a case where a matted image such as cloth or texture design is desired. Further, when the dye receptor layer is partially transferred to plain paper, etc., to form an image on the dye receptor layer, and ordinary letters, etc., are printed on another portion by another means, the resultant image formed on the dye receptor layer is utterly different from that formed on the plain paper portion. As a result, the entirety of the resultant images appear to be unsuitable or inadequate.

Further, other letters, etc., are written on the above image by using another means such as a pencil, in some cases. In such a case, however, it is difficult to effect writing because of the surface smoothness or the presence of the release agent.

As a method for solving the above problem, there is known a method wherein a so called mat agent (or matting agent) such as kaolin clay, silica, and calcium carbonate is added to the dye receptor layer, as a disclosed in, e.g., Japanese Laid Open Patent Application No. 105689/1987. However, in such a method, a large amount of the mat agent is required in order to reduce the resultant gloss, and therefore the dye receiving property of the dye receptor layer is diminished. As a result, the reproducibility of dots is decreased to cause white dropout or toughening, whereby the resultant image quality is considerably lowered.

Japanese Laid Open Patent Application No. 55190/1990 discloses a method wherein a sheet for regulating (or modifying) the surface condition is pressed to the surface of the thermally transferred image under heating so as to met the image. In this method, however, heating operation is required and there is posed a problem such that the formed dye image is blurred.

Further, in most cases, it is necessary to record information such as letters and symbols, simultaneously with the formation of the above dye image. As a matter of course, such letter information can simultaneously be recorded by using the sublimation type thermal transfer system. However, the resultant letter image formed by such a system is generally unclear because of a limit to the resolution of a thermal head to be used in the above system, and is inferior in image density to black letters provided by other printing means such as heat melting type thermal transfer system, and electrophotographic system.

Accordingly, there has been used a method wherein a gradation image such as photographic image is formed by the sublimation type thermal transfer system and another letter image is formed by other means as described above. In such a case, however, the adhesion property of the other letter images to the receptor layer is poor, so that such images are liable to be peeled by rubbing, etc.

In the above thermal transfer method, for the purpose of improving the migrating property of the dye, both of the dye layer and dye receptor layer are caused to have a smooth surface so that the thermal transfer sheet may closely contacts the thermal transfer image receiving sheet, and a release agent such as silicone oil is contained in or applied onto the dye layer and/or dye receptor layer so that these layers are not bonded to each other by heat fusion after the printing operation.

In such a case, however, there is posed a problem such that the adhesion property between the thermal transfer sheet and dye receptor layer is poor, and therefore the migration of the dye is obstructed, and white dropout, image defect, etc., are produced in the resultant image.

Such a problem may also be posed in the same manner, in a case where post card paper, plain paper, etc., having rough texture are used as the substrate sheet of the image receiving sheet, in place of the mat image receiving sheet, and minute defects are present in the dye receptor layer on the basis of the above rough texture of the substrate.

SUMMARY OF THE INVENTION

An object of the present invention is to provide a thermal transfer image receiving sheet having a dye receptor layer which is capable of forming a good image by using a thermal transfer system, and a process for producing such a sheet.

Another object of the present invention is to provide a thermal transfer sheet which is excellent in dye migration property at the time of thermal transfer operation and is capable of providing a good image having no image defect, white dropout, etc.

According to a first embodiment of a first invention, there is provided a thermal transfer image receiving sheet comprising a substrate sheet and a dye receptor layer disposed on at least one surface side of the substrate sheet, wherein the dye receptor layer has been formed on the substrate sheet by superposing the substrate sheet onto a receptor layer transfer film comprising a substrate film and the dye receptor layer disposed on one surface side thereof which is peelable from the substrate film, so that the receptor layer transfer film is bonded to the substrate sheet to form a laminate, and peeling the substrate film from the laminate.

According to the above first embodiment, there may easily be provided a thermal transfer image receiving sheet excellent in surface smoothness.

According to a second embodiment of the first invention, there is provided a thermal transfer image receiving sheet comprising a substrate sheet and a dye receptor layer disposed on at least one surface side of the substrate sheet, wherein the dye receptor layer contains a fibrous inorganic filler.

According to the above second embodiment, there can be formed a matted image capable of being subjected to writing operation, without decreasing the resultant image quality.

According to a third embodiment of the first invention, there is provided a thermal transfer image receiving sheet comprising a substrate sheet and a dye receptor layer disposed on at least one surface side of the substrate sheet, wherein the substrate sheet has been formed by laminating at least two heat-shrinkable sheet materials so that the difference between the heat shrinkage directions thereof corresponds to an angle of 45 degrees or below.

According to the third embodiment, the occurrence of curl in the thermal transfer image receiving sheet can effectively be prevented at the time of thermal transfer operation.

According to a fourth embodiment of the first invention, there is provided a thermal transfer receiving sheet comprising a substrate sheet and a dye receptor layer disposed on at least one surface side substrate sheet, the image receiving sheet having a total tear strength (inclusive of initial tear strength) in the range of 20 to 200, as measured according to JIS-P-8116.

According to the above fourth embodiment, the thermal transfer image receiving sheet can easily be torn by hands or various machine.

According to a fifth embodiment of the first invention, there is provided a thermal transfer image receiving sheet comprising a substrate sheet and a dye receptor layer disposed on at least one surface side of the substrate sheet, the image receiving sheet having a total rigidity in the range of 10 to 100 m$^3$, as measured according to JIS-P8143.

According to the above fifth embodiment, the thermal transfer image receiving sheet can easily be subjected to folding or filing.

According to a sixth embodiment of the first invention, there is provided a thermal transfer image receiving sheet comprising a substrate sheet and a dye receptor layer disposed on at least one surface side of the substrate sheet, wherein the substrate sheet comprises a heat-resistant synthetic paper which has been formed by stretching a composition comprising a synthetic resin and a filler, and crosslinking the synthetic resin component by use of an electron beam.

According to the above sixth embodiment, there may easily be provided a thermal transfer image receiving sheet excellent in heat resistance.

According to a seventh embodiment of the fist invention, there is provided a thermal transfer image receiving sheet comprising a substrate sheet and a dye receptor layer disposed on at least one surface side of the substrate sheet, wherein the dye receptor layer comprises a resin and a release agent and the release agent is contained in an amount of 0 to 10 wt. parts with respect to 100 wt. parts of the resin.

According to the above seventh embodiment, dye images excellent in gradation property and non-gradation image excellent in image density and resolution may be formed on the same recording sheet.

According to an eighth embodiment of the first invention, there is provided a thermal transfer image receiving sheet comprising a substrate sheet and a dye receptor layer disposed on at least one surface side of the substrate sheet, wherein at least one layer constituting the thermal transfer image receiving sheet is colored pale blue.

According to the above eighth embodiment, the image quality of the resultant image can be maintained for a long period of time. Particularly in the case of a transparent type, the visibility of the resultant image is improved in addition to the maintenance of the image quality.

According to a ninth embodiment of the present invention, there is provided a thermal transfer image receiving sheet comprising a substrate sheet and a dye receptor layer disposed on at least one surface side of the substrate sheet, wherein the dye receptor layer contains substantially no filler and has a surface glossiness of 30% or below.

According to the above ninth embodiment, there is provided a thermal transfer image receiving sheet which is capable of providing matted images free of blurring and which can be subjected to writing operation.

According to a tenth embodiment of the present invention, there is provided a thermal transfer image receiving sheet comprising a substrate sheet and a dye receptor layer disposed on at least one surface side of the substrate sheet through the medium of a bubble containing layer, wherein the bubble containing layer contains filler.

According to an eleventh embodiment of the present invention, there is provided a thermal transfer image receiving sheet comprising a substrate sheet and a dye receptor layer disposed on at least one surface side of the substrate sheet through the medium of a bubble containing layer and an intermediate layer.

According to the above tenth and eleventh embodiments, there may easily be provided a thermal transfer image receiving sheet excellent in surface strength and having an improved cushion property.

According to a second invention, there is provided a process for producing a thermal transfer image receiving sheet, comprising:

superposing a substrate sheet onto a receptor layer transfer film comprising a substrate film and a dye receptor layer disposed on one surface side thereof which is peelable from the substrate film, so that the receptor layer transfer film is bonded to the substrate sheet to form a laminate, and peeling the substrate film from the laminate thereby to form a dye receptor layer on at least one surface side of the substrate sheet.

According to the above second invention, a thermal transfer image receiving sheet excellent in surface smoothness can be provided at a high productivity and a low cost, without subjecting the substrate sheet used therefor to sealing operation.

According to a third invention, there is provided a thermal transfer sheet, comprising a substrate film, an intermediate layer disposed on the substrate film, and a dye layer disposed on the substrate film by the medium of the intermediate layer, wherein the dye layer comprisies a dye and a binder resin, and at least one of the intermediate layer and the dye layer contains bubbles.

According to the above third invention, there can be provided a thermal transfer sheet having an improved cushion property and being capable of providing good images excellent in image density which have a good dye migration property at the time of thermal transfer operation and are free of white dropout or image defect, even when an image receiving sheet as a transfer receiving material has a surface poor in surface smoothness.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view showing an embodiment of the thermal transfer image receiving sheet according to the present invention.

FIG. 2 is a schematic sectional view showing another embodiment of the thermal transfer image receiving sheet according to the present invention.

FIG. 3 is a view for illustrating a shrinkage direction in a thermal transfer image receiving sheet.

DESCRIPTION OF PREFERRED EMBODIMENTS

Figure 4:
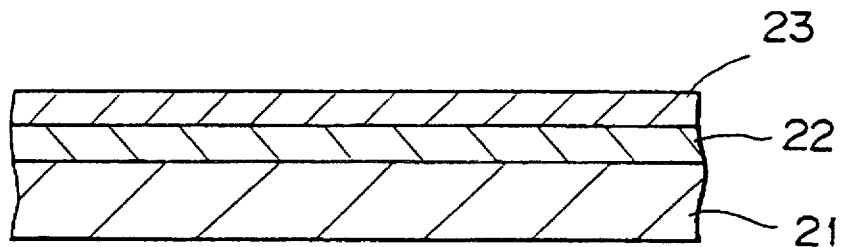
FIG. 4 is a schematic sectional view showing another embodiment of the thermal transfer image receiving sheet according to the present invention.

Hereinbelow, the present invention will be described in more detail with reference to preferred embodiments thereof.

Referring to FIG. 1, the thermal transfer image receiving sheet according to the present invention comprises substrate sheet 1, and a dye receptor layer 2 disposed on at least one surface side of the substrate sheet 1. In this embodiment, the dye receptor layer 2 is disposed on one surface side of the substrate sheet 1.

Substrate sheet

Specific examples of the substrate sheet to be used in the present invention may include various papers such as synthetic paper (polyolefin type, polystyrene type, etc.), paper of fine quality or wood free paper, art paper or coated paper, cast coated paper, wall paper, backing paper, synthetic resin impregnated paper or emulsion impregnated paper, synthetic rubber latex impregnated paper, synthetic resin containing paper, paper board, cellulose fiber paper, and the like; and various sheets or films of plastics such as polyolefin, polyvinyl chloride, polyethylene terephthalate, polystyrene, polymethacrylate, polycarbonate, and the like. Further, the substrate film 1 may also comprise a white opaque film formed from a mixture of the above synthetic resin and white pigment or filler, or a foamed sheet which has been subjected to foaming operation. However, the substrate sheet 1 usable in the present invention should not be restricted to the above specific examples.

In addition, a laminate comprising an optional combination of the above substrate films may also be used as the substrate sheet 1. Representative examples of such a laminate may include: a combination of cellulose fiber paper and synthetic paper, and of cellulose fiber paper and a plastic film or sheet.

The above substrate film may have an appropriate thickness, and for example, it may generally have a thickness of about 10 to 300 μm.

In a case where the thermal transfer image receiving sheet is disposed (or scrapped) or cut into an appropriate size after the use thereof, etc., when the image receiving sheet is torn by hand or cut by means of a knife, scissors, a shredder and the like, the substrate sheet may preferably have a tear strength (or tear propagation strength) in the range of about 15 to 185 as measured according to JIS P 8116, in consideration of a balance between the strength thereof and easiness in the tearing or cutting thereof. When such a substrate sheet is used, the entirety of the thermal transfer image receiving sheet may have a tear strength of 20 to 200, so that it may easily be torn by hands or cut by means of various machines.

In a case where the thermal transfer image receiving sheet is further subjected to folding or filing operation, the substrate sheet may preferably have a rigidity in the range of about 7 to 95 m³ as measured according to JIS P 8143, in consideration of the easiness in folding and prevention of bulkiness thereof after the filing. When such a substrate sheet is used, the entirety of the thermal transfer image receiving sheet may have a rigidity in the range of 10 to 100 m³, so that it may easily be subjected to folding or filing operation.

The substrate sheet may also comprise a laminate for the purpose of preventing the occurrence of curl in the thermal transfer image receiving sheet. FIG. 2 is a schematic sectional view showing an embodiment of the thermal transfer image receiving sheet according to the present invention wherein such a substrate film of a laminate type is used.

Referring to FIG. 2, the substrate sheet 1 comprise a laminate comprising a core material 11 of paper, etc., and heat shrinking (or heat shrinkable) sheet material layers 12 and 12' disposed on both surface sides of the core material 10, and a dye receptor layer 13 is formed on at least one surface side of such a laminate.

FIG. 3 is a schematic view for illustrating the direction of the heat shrinkage of the two heat shrinking sheet 12 and 12' of the above thermal transfer image receiving sheet. The direction of the heat shrinkage is defined as a direction wherein the largest shrinkage of the heated material is observed.

In FIG. 3, the direction of the heat shrinkage of the sheet disposed on the front side is denoted by an arrow of a solid line, and the direction of the heat shrinkage of the sheet disposed on the back side is denoted by an arrow of a broken line. In FIG. 3A, the directions of the heat shrinkage of the films disposed on front and back sides are perpendicular to each other. In such a case, the resultant thermal transfer image receiving sheet causes considerable curl. In FIG. 3B, the directions of the heat shrinkage of the films disposed on front and back sides form an angle of about 25° (25 degrees) therebetween. In such a case, the resultant thermal transfer image receiving sheet causes a little curl, which is in a practically tolerable range. In FIG. 3C, the directions of the heat shrinkage of the films disposed on front and back sides are substantially the same as each other. In such a case, in the resultant thermal transfer image receiving sheet, the occurrence of curl is prevented most effectively.

The core material 11 to be used for such a purpose may be selected from various films and sheets for substrate film as described above. In consideration of the cost, nerve, etc., of the core material, preferred examples thereof may include various papers such as paper of fine quality or wood free paper, art paper or coated paper, cast coated paper, wall paper, backing paper, synthetic resin impregnated paper or emulsion impregnated paper, synthetic rubber latex impregnated paper, synthetic resin containing paper, and paper board. The above core material may have an appropriate thickness, but it may generally have a thickness of about 30 to 200 μm.

As the heat shrinking sheet materials 12 and 12' to be laminated on both sides of the above core material 11, there may be used synthetic paper, synthetic resin sheet, foamed polypropylene, foamed polyethylene, foamed polystyrene, etc. Among these, synthetic paper or foamed polypropylene is preferred in view of various strengths and cushion property.

The heat shrinking sheet material may preferably have a thickness of 30 μm to 80 μm. It is preferred that the heat shrinking sheet materials 12 and 12' comprising the same material and having the same thickness are laminated on both sides of the core material 11. However, it is possible that heat shrinking sheet materials comprising different materials and having different thicknesses are laminated on both sides of the core material, as long as the difference (or deviation) between the directions of the heat shrinkage thereof is in the range of 45 degrees or smaller, more preferably 30 degrees or smaller.

The resultant laminte (substrate sheet) having a three layer structure may preferably have a total thickness in the range of 100 to 300 μm, which may appropriately be determined in consideration of its nerve, curl, weight, cost, conveying property, etc.

In the above embodiment, two heat shrinking sheet materials are bonded to both surfaces of the core material. However, a similar effect may be obtained when the core material is omitted and the two sheet materials are directly laminated on each other.

The substrate sheet to be used in the present invention may also comprise a heat resistant synthetic paper having a porosity. Such a heat resistant synthetic paper may be obtained by stretching a composition comprising a porous synthetic resin and a filler to form a porous synthetic paper, and subjecting the resultant porous synthetic paper to crosslinking treatment by means of an electron gun, etc.

The porous synthetic paper to be used in the present invention may be obtained by melt kneading a composition comprising a thermoplastic resin such as polypropylene and an inorganic filler, forming the resultant kneaded product into a film by an extrusion film formation process, and then stretching the film in the longitudinal direction thereof to form a core material, extrusion laminating films comprising a similar composition as described above on both sides of the core material, and stretching the resultant laminate in the lateral direction thereof. The porous synthetic paper per se and the production process therefor per se may be those known in the prior art.

In the electron beam crosslinking treatment of the above porous synthetic paper, known synthetic paper as such may be irradiated with an electron beam. In such a case, however, the resultant degree of crosslinking (or crosslinking degree) is relatively low as compared with the electron beam irradiation dose. Accordingly, it is preferred to preliminarily incorporate an electron beam crosslinking component in the porous synthetic paper before the electron beam irradiation.

Specific examples of such a crosslinking component may include polymers, oligomers and/or monomers having a radical polymerizable double bond in the structure thereof. More specifically, such polymers may include: polyester resin, polyether resin, acrylic resin, epoxy resin, urethane resin, alkyd resin, spiro acetal resin, polybutadiene resin, polythiol polyene resin, etc. The above oligomers may include: polyfunctional (meth)acrylates comprising polyhydric alcohols, etc. The above monomers may include: monofunctional monomers such as ethyl (meth)acrylate, ethylhexyl (meth)acrylate, styrene, methylstyrene, and N vinylpyrrolidone; and polyfunctional monomers such as divinylbenzene, trimethylolpropane tri(meth)acrylate, hexanediol di(meth)acrylate, tripropyleneglycol di(meth)acrylate, diethyleneglycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

Specific examples of a peroxide capable of providing radical under the action of an electron beam may include organic peroxide such as acetyl cyclohexyl peroxide, isobutyl peroxide, diisopropyl peroxide carbonate, di-n-propyl peroxide carbonate, dimyristyl peroxide carbonate, di(2-ethoxyethyl)perxodie carbonate, 2,4-dichlorobenzoyl peroxide, t-butyl peroxypivalate, 3,5,5-trimethyl hexanonyl peroxide, octanonyl peroxide, lauroyl peroxide, acetyl peroxide, m-toluoyl peroxide, benzoyl peroxide, cyclohexanone peroxide, methyl ethyl ketone peroxide, dicumyl peroxide, and cumene hydroperoxide.

In general, the above crosslinking component is added to a resin composition before the film formation of the porous synthetic paper. It is generally preferred to prepare a synthetic paper which contains a non volatile crosslinking component in advance. However, it is also possible to use a method wherein commercially available porous synthetic paper is impregnated with an oligomer or monomer (particularly, a polyfunctional monomer) having a relatively low molecular weight, or with a solution prepared by dissolving the above peroxide in an organic solvent.

Since the crosslinking comopnent to be contained in a resin may be changed corresponding to the kind, molecular weight, number of functional groups thereof, it is difficult to determine the addition amount thereof in a single way. However, in general, the addition amount of the crosslinking component may be in the range of 0.5 to 50 wt. parts with respect to 100 wt. parts of the thermoplastic resin such as polypropylene.

The electron beam to be used for the crosslinking of the synthetic paper containing the crosslinking component may be one having an energy of 50 to 1,000 KeV, more preferably 100 to 300 KeV, which may be emitted from various electron beam accelerator such as Cockroft Walton type, Van de Graf type, resonance transformer type, insulating core transformer type, linear type, Dynamitron type, and high frequency type.

The thus obtained heat resistant synthetic paper may have an appropriate thickness, and for example, it may generally have a thickness of about 10 to 300 μm.

When the above substrate film shows a poor adhesion with respect to the dye receptor layer to be formed thereon, it is preferred to subject the surface of the film to primer treatment or corona discharge treatment.

Dye receptor layer

The dye receptor layer to be formed on the surface of the above substrate film is one such that it may receive a sublimable dye migrating from (or transferring from) the thermal transfer sheet and may retain the thus formed image.

For the purpose of forming the dye receptor layer, there may be used a method wherein a receptor layer transfer sheet is superposed on the above substrate film for the thermal transfer image receiving sheet, and thereafter the substrate film of the receptor layer transfer sheet is peeled from the resultant superposition thereby to transfer the dye receptor layer to the above substrate. Further, there may also be used a method wherein a coating material for forming the dye receptor layer is applied onto the substrate film for the thermal transfer image receiving sheet.

(Formation of dye receptor layer by transfer method)

The receptor layer transfer film to be used in the present invention comprises a substrate film and a dye receptor layer disposed on one side thereof, wherein the dye receptor layer is peelable from the substrate film. In a preferred embodiment, a heat sensitive or pressure sensitive adhesive layer is disposed on the surface of the receptor layer.

According to an embodiment of the present invention, the above receptor layer transfer film is superposed on a substrate sheet for an image receiving sheet, these sheets are pressed by appropriate pressing means thereby to bond these sheets to each other, and then the substrate film is peeled from the resultant superposition, thereby to obtain a desired thermal transfer image receiving sheet.

In another embodiment of the present invention, when the substrate of the image receiving sheet comprises a plastic sheet, the surface of the receptor layer may be extrusion coated with the above plastic material, thereby to omit a step of forming a heat sensitive or pressure sensitive adhesive layer on the surface of the receptor layer constituting the receptor layer transfer film.

The substrate film to be used for the receptor-layer transfer film according to the present invention may be the same as that used in the conventional thermal transfer film as such. However, the substrate sheet usable in the present invention is not restricted to such a conventional substrate film, but may also be another substrate film.

Specific examples of the preferred substrate film may include: thin papers such as glassine paper, capacitor paper, and paraffin paper; plastic sheets or films comprising plastics such as polyester, polypropylene, cellophane, polycarbonate, cellulose acetate, polyethylene, polyvinyl chloride, polystyrene, nylon, polyimide, polyvinylidene chloride, and ionomar; substrate films comprising a composite of such a plastic sheet or film and the paper as described above; etc.

The thickness of the substrate sheet may appropriately be changed corresponding to the material constituting it so as to provide suitable strength and heat resistance thereof, but the thickness may preferably be 3 to 100 μm.

It is preferred to form a release layer on the surface of the substrate film, prior to the formation of the receptor layer. Such a release layer may be formed from a release agent such as waxes, silicone wax, silicone resins, fluorine containing resins, and acrylic resins. The release layer may be formed in the same manner as that for a receptor layer as described hereinbelow. It is sufficient that the release layer has a thickness of about 0.5 to 5 μm. When a matte (or matted) receptor layer is desired after the transfer operation, it is possible to incorporate various particles in the release layer, or to use a substrate film having a matted surface on the release layer side thereof so as to provide a matted surface. As a matter of course, when the above substrate sheet has an appropriate releasability, it is not necessary to form the release layer.

The dye receptor layer to be formed on the surface of the above substrate film is one such that it may receive sublimable dye migrating from (or transferring from) the thermal transfer film after it is transferred to an arbitrary (or optional) transfer receiving material, and may retain the thus formed image.

Specific examples of the resin for forming the dye receptor layer may include: polyolefin type resin such as polypropylene; halogenated polymer such as polyvinyl chloride, vinyl chloride-vinyl acetate copolymer, ethylene-vinyl acetate copolymer, and polyvinylidene chloride; vinyl type polymers such as polyvinyl acetate and polyacrylic acid esters; polyester type resin such as polyethylene terephthalate and polybutylene terephthalate; polystyrene type resins; polyamide type resins; copolymer resins comprising olefin such as ethylene and propylene, and another vinyl monomer; ionomers, cellulose type resins such as cellulose diacetate; polycarbonate; etc. Particularly preferred examples thereof may include vinyl type resins and polyester type resins.

Preferred examples of the release agent to be used as a mixture with the above resin may include: silicone oil, phosphoric acid ester type surfactants, fluorine containing surfactants, etc. Particularly preferred examples thereof may include silicone oil. Such a silicone oil may preferably be a modified silicone oil such as epoxy modified silicone oil, alkyl modified silicone oil, amino modified silicone oil, carboxyl modified silicone oil, alcohol modified silicone oil, fluorine modified silicone oil, alkylaralkylpolyether modified silicone oil, epoxy. polyether modified silicone oil, and polyether modified silicone oil.

The release agent may be used either singly or as a combination of two or more species thereof. The release agent may preferably be added to the dye receptor layer in an amount of 0.5 to 30 wt. parts with respect to 100 wt. parts of the resin constituting the dye receptor layer. If such an addition amount is not in the above range, there occurs a problem such that the thermal transfer film sticks to the dye receptor layer or the printing sensitivity can be lowered, in some cases. When the above release agent is added to the dye receptor layer, the release agent is bled or exuded to the surface of the receptor layer after the transfer operation so as to form thereon a release layer.

The receptor layer may be formed by applying a solution or dispersion to one side surface of the above substrate film and then drying the resultant coating. The dispersion may be prepared by adding an additive such as release agent, to the resin as described above, as desired, and dissolving the resultant mixture in an appropriate organic solvent, or by dispersing the mixture in an organic solvent or water. The resultant solution or dispersion may be applied onto the substrate sheet, e.g., by a gravure printing method, a screen printing method, a reverse roll coating method using a gravure plate, etc.

When the above receptor layer is formed, a fluorescent brightening agent, a pigment or filler such as titanium oxide, zinc oxide, kaolin clay, calcium carbonate and silica fine powder can be added to the receptor layer for the purpose of improving the whiteness of the dye receptor layer to further improve the clarity (or color definition) of the resultant transferred image.

The dye receptor layer to be formed in the above manner can have an arbitrary thickness, but may generally have thickness of 1 to 50 μm. Such a dye receptor layer may preferably comprise a continuous coating but may also be formed as a discontinuous coating by using a resin emulsion or resin dispersion.

It is preferred to further dispose a heat-sensitive or pressure-sensitive adhesive layer on the surface of the above receptor layer so as to improve the transferability of the above layers. After the dye receptor layer is transferred to the substrate, the adhesive layer may also function as an intermediate layer with respect to the resultant image receiving sheet. In the formation of the above adhesive layer, it is preferred to use adhesives for dry laminating such as two component type polyurethane type adhesive or epoxy type adhesive which have been used in the lamination of films in the prior art; adhesives for wet laminating such as vinyl acetate resin emulsion and acrylic resin emulsion; and hot melt adhesive such as ethylene-vinyl acetate copolymer type, polyamide type, polyester type, and polyolefin type. The adhesive layer may preferably have a thickness of about 0.5 to 40 μm.

When good cushion property or good heat insulating property at the time of image formation are required to be imparted to the thus obtained image receiving sheet, it is preferred to incorporate a foaming agent in the above adhesive.

The foaming agent to be used for such a purpose may be one which is capable of being decomposed under heating to generate a gas such as oxygen, carbonic acid gas, and nitrogen. Specific examples of such a foaming agent may include: decomposition type foaming agents such as dinitropentamethylenetetramine, diazoaminobenzene, azobisisobutyronitrile, and azodicarboamide; and known foaming agent (or foaming material) such as so-called micro balloon which may be prepared by microencapsulating a low-boiling point liquid such as butane and pentane, with a resin such as polyvinylidene chloride and polyacrylonitrile. Further, it is also possible to use a foaming material which is prepared by subjecting the above micro balloon to foaming operation in advance, or the above "micro balloon" coated with a white pigment.

The above foaming agent or foaming material may preferably be used in an amount such that the layer containing the bubbles may provide a foaming magnification (or expansion coefficient) in the range of about 1.5 to 20. For example, it is preferred to use the foaming agent or foaming material in an amount of 0.5 to 30 wt. parts with respect to 100 wt. parts of the resin constituting the adhesive layer functioning as an intermediate layer. The foaming agent may be subjected to a foaming operation at the time of the formation of the dye receptor layer transfer film, or at the time of the transfer of the dye receptor layer. In addition, it is possible that the receptor layer (and optionally, the intermediate layer) which is not subjected to the foaming operation is transferred to the substrate, and the receptor layer is subjected to the foaming operation under heating due to a thermal head at the time of image formation. The time of the foaming operation may arbitrarily be effected by selecting the kind of the foaming agent, the temperature used for transferring the dye receptor layer, etc.

In the above embodiment, the microcapsule type foaming agent such as "microsphere" has an outer wall even after the foaming operation, and therefore such a foaming agent is particularly preferred since it does not provide a defect such as a pin hole in the adhesive layer, tackiness agent layer, or receptor layer.

When a fluorescent brightening agent or a white pigment selected from various species thereof such as titanium oxide is added to the intermediate layer, in place of or in addition to the above foaming agent, the whiteness of the receptor layer after the transfer operation may be improved. In addition, when the substrate sheet for the thermal transfer image receiving sheet comprises paper, the yellowish hue of the paper may be hidden by the above agent or pigment. As a matter of course, another optional additive such as extender pigment and filler may be added to the intermediate layer, as desired.

Particularly, when the substrate for the thermal transfer image receiving sheet comprises a plastic sheet, the pressure sensitive adhesive layer may be omitted by adopting an extrusion laminating method as the film formation method therefor, and extruding the plastic sheet by extrusion coating onto the surface of the receptor layer constituting the dye receptor layer transfer film. It is also possible that the receptor layer surface of the receptor layer transfer film is subjected to laminating while a thermoplastic resin such as polyethylene is extruded to the above surface of the substrate for the thermal transfer image receiving sheet by using the above method, and then the substrate film of the receptor layer transfer film is peeled from the resultant laminate.

As the use of the thermal transfer method is widened, it has been desired that an image receiving paper which is similar to plain paper is used, and pulp paper such as plain paper is used as the substrate of the image receiving sheet. In such a case, it is possible to obtain an image receiving sheet (plain paper like image receiving sheet) which is similar to plain paper by regulating the eBekk smoothness of the paper to 100 to 20,000 sec. Further, when the transfer surface of the receptor layer is caused to have a smoothness in the above range and the surface thereof reverse to the transfer surface is caused to have a smoothness of 5 to 400 sec. which is the same as that of plain paper, it is possible to obtain an image receiving sheet having a receptor layer excellent in smoothness while the entirety thereof is kept more plain paper like.

In the above method, static electricity is considerably generated when the substrate film is peeled after the receptor layer is transferred to the substrate for the image receiving sheet. As a result, a defect such as blister is caused in the transfer receptor layer to lower the resultant yield, the operability of the peeling, etc., is impaired, and further fire can be caused in some cases. Particularly, when a matted film is used as the substrate film or a matted release layer is disposed on the substrate film for the purpose of obtaining the plain paper like transfer receptor layer surface, the above problem of electrification becomes more series.

In such a case, it is preferred to incorporate an antistatic agent in at least one layer selected from the substrate film, release layer, mat layer, dye receptor layer and adhesive layer constituting the receptor layer transfer film, and the substrate for the image receiving sheet. Preferred examples of such an antistatic agent may include fatty acid esters, sulfuric acid esters, phosphoric acid esters, amides, quaternary ammonium salts, betaines, amino acid salts, ethylene oxide adducts, etc. The amount of the antistatic agent to be used for such a purpose can vary depending on the kind of the antistatic agent and the kind of the layer to which the antistatic agent is to be added. In all cases, the addition amount (or usage) thereof may preferably be 0.01 to 0.5 g/m$^2$ so as to provide a surface resistance of the receptor layer transfer film or the substrate for the image receiving sheet in the range of to $10^{12}$ Ω. cm. If the amount of the antistatic agent to be used for such a purpose is too small, the resultant antistatic effect is not sufficient. On the other hand, the addition amount thereof is too large, such a usage is not economical and a problem of stickiness (or tackiness) can occur.

In order to transfer the receptor layer, there may preferably be used an ordinary laminator. As the lamination means to be used for such a purpose may include, e.g., dry lamination, wet lamination, extrusion lamination, hot melt lamination, etc.

(Formation of dye receptor layer by coating method)

In order to form the dye receptor layer by a coating method, it is possible to use the same as that selected from various resins as described above with reference to the transfer method.

The dye receptor layer may be formed by applying a solution or dispersion to at least one side surface of the above substrate film for the thermal transfer image receiving sheet and then drying the resultant coating. The solution or dispersion may be prepared by adding an additive to the resin as described above, as desired, and dissolving the resultant mixture in an appropriate organic solvent, or by dispersing the mixture in an organic solvent or water. The resultant solution or dispersion may be applied onto the substrate film, e.g., by a gravure printing method, a screen printing method, a reverse roll coating method using a gravure plate, etc.

When the above dye receptor layer is formed, a pigment or filler such as titanium oxide, zinc oxide, kaolin clay, calcium carbonate and silica fine powder can be added to the dye receptor layer for the purpose of improving the whiteness of the dye receptor to further improve the clarity (or color definition) of the resultant transferred image.

The dye receptor layer to be formed in the above manner can have an arbitrary thickness, but may generally have a thickness of 1 to 50 μm. Such a dye receptor layer may preferably comprise a continuous coating but may also be formed as a discontinuous coating by using a resin emulsion or resin dispersion.

Hereinbelow, there is described an embodiment which is commonly applicable to the above transfer method and coating method.

First, in the present invention, it is possible to add a fibrous inorganic filler (whisker) to the above dye receptor layer. Specific examples of the whisker may include: potassium titanate whisker, zinc oxide whisker, graphite whisker, silicon nitride whisker, silicon carbide whisker, etc. Such a whisker may preferably be added to the dye receptor layer in an amount of 1.0 to 50 wt. parts with respect to 100 wt. parts of the resin constituting the dye receptor layer. The whisker may preferably have an average length of 5 to 50 μm, and may preferably have an average diameter of 0.1 to 1 μm. It is also possible to treat the surface of the whisker with an amino type or epoxy type silane coupling agent, titanate, etc., as desired, or to subject the surface to metallizing.

It is also possible to cause the dye receptor layer formed in the above manner to have a glossiness of 30% or lower, substantially without incorporating filler therein. For such a purpose, it is possible to use a method wherein the image receiving sheet is passed between a heated embossing roller and a nip roller, a method wherein the image receiving sheet is passed between heated nip rollers with a shaping sheet having surface unevenness configuration, etc.

In the above method using the embossing roller, when the surface unevenness of the embossing roller has a height of convexity (of depth of concavity) in the range of about to 500 μm, and a pitch of the unevenness in the range of about 1 to 500 μm, the resultant shaped dye receptor layer may have a glossiness of 30% or lower.

In a case where the above shaping sheet is used, the shaping sheet may preferably have a surface unevenness having the above parameters in the same range as described above. When a texture similar to that of paper is imparted to the dye receptor layer, plain paper, etc., may be used as the shaping sheet.

In the present invention, the above glossiness may be measured by means of a gloss meter (trade name: KY5, mfd. by Asahi Seiko K.K.).

Basically, the thermal transfer image receiving sheet according to the present invention having the above structure will sufficiently be used for an intended purpose. In the present invention, however, a release agent can be contained in the dye receptor layer so as to impart thereto good releasability with respect to the thermal transfer sheet.

Preferred examples of the release agent to be used for such a purpose may include; silicone oil, phosphoric acid ester type surfactants, fluorine containing surfactants, etc. Particularly preferred examples thereof may include silicone oil. Such a silicone oil may preferably be a modified silicone oil such as epoxy modified silicone oil, alkyl modified silicone oil, amino modified silicone oil, carboxyl modified silicone oil, alcohol modified silicone oil, fluorine modified silicone oil, alkylaralkylpolyether modified silicone oil, epoxy.polyether modified silicone oil, and polyether modified silicone oil.

The release agent may be used either singly or as a combination of two or more species thereof. The release agent may preferably be added to the dye receptor layer in an amount of 0 to 20 wt. parts, particularly 3 to 12 wt. parts, with respect to 100 wt. parts of the resin constituting the dye receptor layer. If such an addition amount of the release agent is too small, there can occur problem such that the thermal transfer sheet sticks to the dye receptor layer or the printing sensitivity can be lowered, while good adhesion property of the ink can be provided. On the other hand, the addition amount of the release agent is too large, good releasability with respect to the thermal transfer sheet may be obtained but the adhesion property of the ink is unsatisfactory.

The image receiving sheet according to the present invention is applicable to various uses such as transfer receiving sheet or card on which thermal transfer recording can be effected, and sheet for forming transmission type manuscript to be used for such a purpose.

In the image receiving sheet according to the present invention, it is also possible to dispose a primer layer or cushion layer, as desired, between the substrate film and the dye receptor layer. Particularly, when the cushion layer is disposed therebetween, noise produced at the time of printing can be suppressed and an image corresponding to image information can reproducibly be formed by transfer recording operation.

Figure 5:
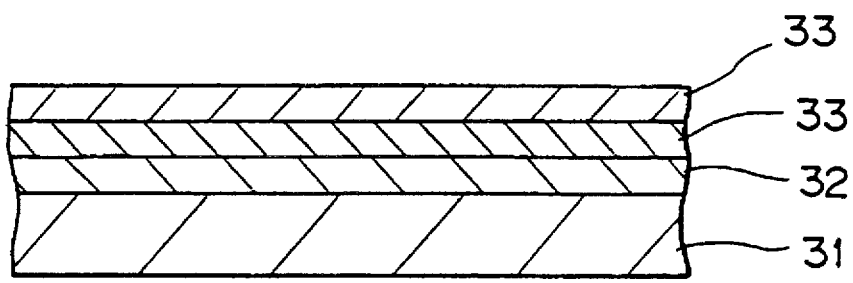
FIG. 5 is a schematic sectional view showing another embodiment of the thermal transfer image receiving sheet according to the present invention.

FIG. 4 and FIG. 5 are schematic sectional views showing embodiments of the thermal transfer image receiving sheet according to the present invention, respectively. Referring to FIG. 4, the thermal transfer image receiving sheet comprises a substrate sheet 21, and a dye receptor layer 23 disposed on the substrate sheet 21 through the medium of a bubble containing layer (a cushion layer) 22. Referring to FIG. 5, the thermal transfer image receiving sheet comprises a substrate sheet 31, and a dye receptor layer 34 disposed on the substrate sheet 31 through the medium of a bubble containing layer (a cushion layer) 32 and a intermediate layer 33.

In order to form the bubble containing layer 22 or 32, it is possible to use the same as that selected from various foaming agents and resins as described above. The bubble containing layer may preferably have a thickness of about 5 to 50 μm.

Specific examples of the material constituting the intermediate layer may include; polyurethane resin, acrylic resin, polyethylene type resin, epoxy resin, etc. Among these, for example, a hard resin mixed with a curing agent is preferred for the purpose of improving the surface strength of the dye receptor layer. The intermediate layer may preferably have a thickness of about 0.1 to 25 μm.

Further, it is possible to add a filler to the above bubble layer 22 or intermediate layer 33 for the purpose of improving the surface strength of the dye receptor layer. As the filler, any of known fillers such as titanium oxide can be used.

It is also possible to dispose a lubricant layer (or lubricating layer) on the back side of the substrate film. Specific examples of the materials for constituting the lubricant layer may include methacrylate resins such as methyl methacrylate, acrylate resins corresponding to such a methacrylate resin, vinyl type resins such as vinyl chdloride-vinyl acetate copolymer, etc.

In the thermal transfer image receiving sheet according to the present invention as described above, when at least one layer constituting the sheet, e.g., dye receptor layer, adhesive layer (primer layer), substrate sheet, back coating sheet, etc., is colored pale blue, the quality of the formed image may be retained for a long period of time. Particularly, in the case of a transparent type thermal transfer image receiving sheet, the discernibleness of the formed image may be improved in addition to the above maintenance of the image quality.

Hereinbelow, there is described an embodiment wherein the above at least one layer is colored pale blue, with reference to the transparent type thermal transfer image receiving sheet.

Figure 6:
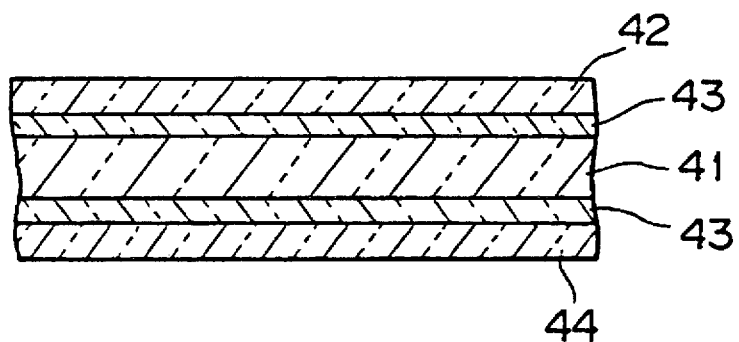
FIG. 6 is a schematic sectional view showing transparent type thermal transfer image receiving sheet according to the present invention.

Referring to FIG. 6, the transparent type thermal transfer image receiving sheet according to the present invention comprises a transparent substrate sheet 41, and a dye receptor layer 42 disposed on a surface of the substrate sheet 41. The image receiving sheet in this embodiment may further comprise an adhesive layer 43 and/or a back coating layer 44, as desired.

The transparent substrate sheet 41 may comprise a material selected from those for the substrate sheet as described above which is capable of providing transparency. Specific examples of such a transparent sheet may include films or sheets of various plastics such as acetylcellulose, polyolefin, polyvinyl chloride, polyethylene terephthalate, polystyrene, polymethacrylate and polycarbonate, which are the same as those used for a film which is to be used in a conventional OHP (overhead projector) or Schaukasten for the purpose of observing an image.

The dye receptor layer 42 may be formed in the same manner as described hereinabove.

The colorant to be used for the above coloring may be one selected from various blue pigments and dyes. Among these, anthraquinon type dyes or phthalocyanine type dyes are preferred in view of the resultant transparency, heat resistance thereof, etc. As a matter of course, it is possible to use another dye or pigment such as cerulean blue and cobalt blue.

The coloring density may vary depending on the kind of the dye or pigment to be used therefor, but may preferably be such that it does not substantially lower the transparency of the image receiving sheet, and a light bluish hue is discernible when the resultant sheet is observed with naked eyes. The concentration of the colorant may preferably be about 0.01 to 0.5 wt %.

The hue of the blue color is also important. When the discernibleness end durability of the image are comprehensively considered, it is preferred that the chromaticity is in the region surrounded by the three points of (x=0.310, y=0.316), (x=0.285, y=0.280) and (x=0.275, y=0.320) in CIE 1931 colorimetric system. Specific examples of the dye suitably used for such coloring may include the following dyes:

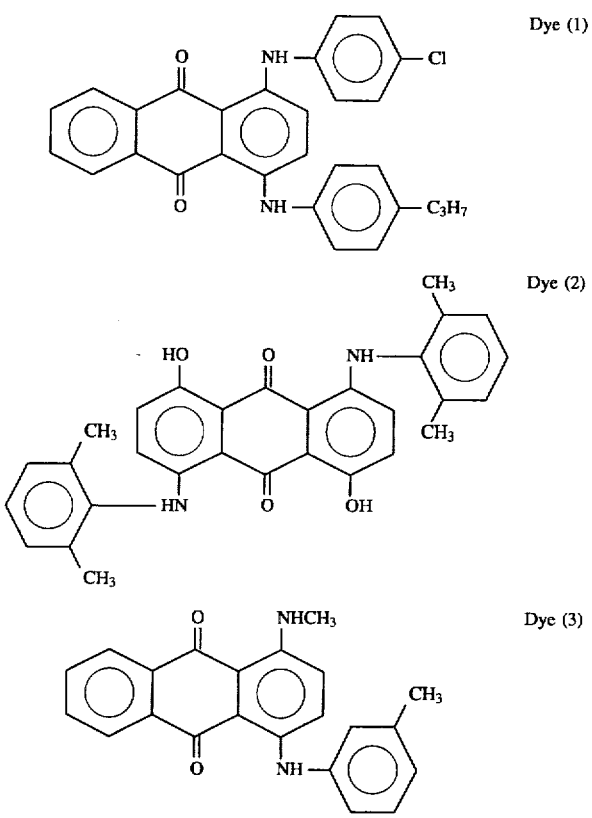

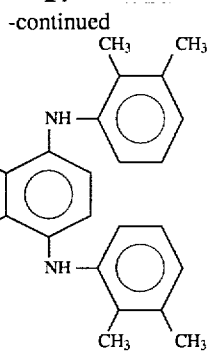

Dye (4)

When the image receiving sheet is colored by using the above colorant, the method used for the coloring, per se may be a conventional method. For example, when the dye receptor layer, adhesive layer, or back coating layer is colored, it is possible to dissolve or disperse an appopriate colorant in a coating liquid for forming such a layer. Further, when the substrate sheet is colored, it is possible to use a so-called mass coloration (or mass coloring) method wherein an appropriate colorant is dissolved or dispersed in a resin for forming the substrate.

In the above embodiment, a transparent type image receiving sheet is described. However, the above description is also applicable to an opaque type thermal transfer image receiving sheet.

In the present invention, it is possible to dispose a detection mark in the image receiving sheet. The detection mark is very useful, e.g., in a case where the thermal transfer sheet is subjected to positioning operation with respect to the image receiving sheet. For example, it is possible to dispose a detection mark which is detectable by means of a phototube detection device, on the back surface of the substrate film by printing, etc.

When thermal transfer operation is effected by using the above thermal transfer image receiving sheet according to the present invention, the thermal transfer sheet to be used in combination therewith is one comprising a sheet such as paper and polyester film, and a dye layer disposed thereon containing a sublimable dye. Any of the conventional thermal transfer sheet as such may be used in the present invention. In this case, when the whisker as described above is also added to the dye layer of the thermal transfer sheet, there can be provided a matted image having better quality.

Hereinbelow, there is described the thermal transfer sheet according to the present invention which is capable of forming good images in combination with any thermal transfer image receiving sheet inclusive of the thermal transfer image receiving sheet according to the present invention as described above.

The thermal transfer sheet according to the present invention basically comprises a substrate film and a dye layer disposed thereon by the medium of an intermediate layer, as desired, in the same manner as in the prior art. However, the thermal transfer sheet according to the present invention is characterized in that bubbles are incorporated in the dye layer and/or the intermediate layer.

The substrate film may preferably have a thickness of, e.g., about 0.5 to 50 μm, more preferably about 3 to 10 μm. Specific examples of the substrate film may include: various papers, various coated papers, polyester film, polystyrene film, polypropylene film, polysulfone film, aramide film, polycarbonate film, polyvinyl alcohol film, cellophane, etc. Particulary preferred examples thereof may include polyester film. The substrate film may be either in a sheet form or a continuous film form, and should not be particularly restricted.

The dye layer to be formed on the above substrate film comprises, at least, an appropriate binder resin, and a dye and bubbles carried therein.

The dye to be used for such a purpose may be any of dyes usable in the conventional thermal transfer sheet, and is not particularly restricted. Preferred examples of such a dye may include: red dyes such as MS Red G, Macrolex Red Violet R, Ceres Red 7B, Samaron Red HBSL, Resolin Red F3BS; yellow dyes such as Horon Brilliant Yellow 6GL, PTY-52, Macrolex Yellow-6G; and blue dyes such as Kayaset Blue 714, Wacsorin Blue AP-FW, Horon Brilliant Blue S-R, and MS Blue 100.

As the binder for carrying the above mentioned dye, any of known binders can be used. Preferred examples of the binder resin may include: cellulose resins such as ethylcellulose, hydroxyethylcellulose, ethylhydroxycellulose, hydroxypropylcellulose, methylcellulose, cellulose acetate, and cellulose acetate butyrate; vinyl type resins such as polyvinyl alcohol, polyvinyl acetate, polyvinyl butyral, polyvinyl acetal, polyvinyl pyrrolidone, and polyacrylamide; and polyester resin. Among these, cellulose type resins, acetel type resins, butyral type resins, and polyester type resins are particularly preferred in view of heat resistance, migration property of the dye, etc.

The dye layer can further contain an additive selected from various additives known in the prior art, as desired.

Such a dye layer may preferably be formed by dissolving or dispersing the above mentioned sublimable dye, binder resin and another optional components in an appropriate solvent to prepare a coating material or ink for forming the dye layer; sequentially applying the coating materil(s) or ink(s) onto the above mentioned substrate film; and drying the resultant coating.

The thus formed dye layer may generally have a thickness of about 0.2 to 5.0 μm, preferably about 0.4 to 2.0 μm. The sublimable dye content in the dye layer may preferably be 5 to 90 wt. %, more preferably 10 to 70 wt. % based on the weight of the dye layer.

In the formation of the dye layer, when a mono color image is desired, a dye of one color selected from the above dyes is used for such a purpose. When a full color image is desired, for example, appropriate dyes of cyan, magenta and yellow colors (and further black color, as desired) are selected to form dye layers of cyan, magenta and yellow colors (and further black color, as desired).

In the present invention, it is also possible to dispose an intermediate layer between the substrate film and the dye layer, for the purpose of improving the adhesion property, cushion property, etc. Specific examples of the material constituting the intermediate layer may include; polyurethane resin, acrylic resin, polyethylene type resin, butadiene rubber, epoxy resin, etc. The intermediate layer may preferably have a thickness of about 0.1 to 5 μm, and may be formed in the same manner as in the case of the above dye layer.

The thermal transfer sheet according to the present invention is mainly characterized in that bubbles are incorporated in at least one layer of the dye layer and the intermediate layer to be formed in the manner as described above. The method of incorporating the bubble in the above layer, may be one wherein a foaming agent is incorporated in a coating liquid to be used at the time of the formation of each of the respective layers, and the foaming agent is subjected to foaming operation at an appropriate temperature at the time of or after the drying of the coating formed by the application of the coating liquid.

The foaming agent to be used for such a purpose may be one which is capable of being decomposed at a high temperature to generate a gas such as oxygen, carbonic acid gas, and nitrogen. Specific examples of such a foaming agent may include: decomposition type foaming agents such as dinitropentamethylenetetramine, diazoaminobenzene, azobisisobutyronitrile, and azodicarboamide; and known foaming agent (or foaming material) such as so-called micro balloon which may be prepared by microencapsulating a low boiling point liquid such as butane and pentane, with a resin such as polyvinylidene chloride and polyacrylonitrile. Further, it is also possible to use a foaming material which is prepared by subjecting the above micro balloon to foaming operation in advance.

The above foaming agent or foaming material may preferably be used in an amount such that the layer containing the bubbles may provide a foaming magnification (or expansion coefficient) in the range of about 1.5 to 20. Particularly preferred examples of the foaming agent may include the above micro balloon which can be subjected to the foaming operation at a relatively low temperature. Samples thereof of various grades are available from Matsumoto Yushi Seiyaku K.K., and each of them may be used in the present invention.

The image receiving sheet to be used for forming an image by use of the thermal transfer sheet as described above may be any one as long as it has a dye receiving property with respect to the above dyes. In a case of a sheet having no dye receiving property, such as paper, metal, glass and synthetic resin, it is possible to form a dye receptor layer on at least one surface of such a sheet.

Particularly, when the thermal transfer sheet according to the present invention is used, good dye migrating property may be obtained and high quality images having no defect such as white dropout or image incompleteness may be formed, even in combination with a matted image receiving sheet prepared by matting the dye receptor layer thereof.

When thermal transfer operation is effected by using the thermal transfer image receiving sheet according to the present invention in combination with the above thermal transfer sheet according to the present invention, or a conventional thermal transfer sheet, the means for applying heat energy to be used for such a thermal transfer operation may be any of various known heat energy application means. For example, when a recording time is controlled by using a recording apparatus such as a thermal printer (e.g., Video Printer VY 100; mfd. by Hitachi K.K.), so as to provide a heat energy of about 5 to 100 mJ/mm$^2$, a desired image may be formed.

Hereinbelow, the present invention will be described in more detail with reference to Examples and Comparative Examples. In the description appearing hereinafter, part(s) and % are part (s) by weight and wt. %, respectively, unless otherwise noted specifically.

EXAMPLE A

Example A-1

A coating liquid for a receptor layer having the following composition was applied onto a surface of a 15 μm thick polyester film (trade name: Lumirror, mfd. by Toray K.K.) by means of a bar coater so as to provide a coating amount of 5.0 g/m$^2$ (after drying), and the resultant coating was preliminarily dried by means of a dryer, and then dried in an oven for 30 min. at 100° C., whereby a dye receptor layer was formed.

Thereafter, a solution of an adhesive agent having the following composition was applied onto the above receptor layer so as to provide a coating amount of 1 g/m$^2$ (after drying) and then dried in the same manner as described above, thereby to form an adhesive layer whereby a receptor layer transfer film to be used in the present invention was obtained.

Composition of coating liquid for receptor layer
Vinyl chloride/vinyl acetate copolymer 100 parts (#1000D, mfd. by Denki Kagaku Kogyo K.K.)
Amino modified silicone 3 parts (X-22-343, mfd. by Shinetsu Kagaku Kogyo K.K.)
Epoxy modified silicone 3 parts (KF-393, mfd. by Shinetsu Kagaku Kogyo K.K.)
Methyl ethyl ketone/toluene 500 parts (wt. ratio=1/1)
Composition of coating liquid for adhesive layer
Urethane type dry laminating agent 100 parts (A-130, mfd. by Takeda Yakuhin Kogyo K.K.)
Curing agent 30 parts (A-3, mfd. by Takeda Yakuhin Kogyo K.K.)

The receptor layer transfer film prepared above was superposed on a surface of coated paper, and the resultant superposition was passed through a laminator to bond these sheets to each other. Then, the substrate film of the receptor layer transfer sheet is peeled from the resultant laminate, thereby to obtain a thermal transfer image receiving sheet according to the present invention.

Example A-2

A thermal transfer image receiving sheet according to the present invention was prepared in the same manner as in Example A-1, except that wet lamination was effected by using an acrylic type emulsion (A-2500, mfd. by Toa Gosei Kagaku Kogyo) as an adhesive, instead of affecting the above dry lamination used in Example A-1.

Example A-3

A thermal transfer image receiving sheet according to the present invention was prepared in the same manner as in Example A-1, except that after the formation of the receptor layer transfer sheet, polyethylene was extruded onto the surface of the receptor layer to form a 20 μm thick polyethylene coating, and then the substrate film of the receptor layer transfer sheet was peeled from the laminate.

Example A-4

A thermal transfer image receiving sheet according to the present invention was prepared in the same manner as in Example A-1, except that 3 parts of a forming material (F-30D, mfd. by Matsumoto Yushi Seiyaku) was added to the adhesive used in Example A-1.

Example A-5

A thermal transfer image receiving sheet according to the present invention was prepared in the same manner as in Example A-1, except that hot melt lamination was effected by using an EVA type hot melt adhesive (Saibinol HM-P-30, mfd. by Saiden Kagaku K.K.) instead of the adhesive used in Example A-1.

Example A-6

A thermal transfer image receiving sheet according to the present invention was prepared in the same manner as in Example A-1, except that NK Crystal coated paper (basis weight: 84.9 g/m$^2$, cast coated paper, mfd. by Nihon Kakoshi K.K.) was used instead of the coated paper used in Example A-1.

Example A-7

A thermal transfer image receiving sheet according to the present invention was prepared in the same manner as in Example A-1, except that SK Tokuhen art paper (basis weight: 104.7 g/m², art paper, mfd. by Sanyo Kokusaku Pulp) was used instead of the coated paper used in Example A-1.

Comparative Example A-1

A thermal transfer image receiving sheet of Comparative Example was prepared in the same manner as in Example A 1, except that the coating liquid for the receptor layer was directly applied onto the surface of the coated paper and then dried.

On the other hand, an ink for a dye layer having the following composition was prepared and applied onto a 6 μm thick polyethylene terephthalate film of which back surface had been subjected to heat resistance imparting treatment, by means of a wire bar coater so as to provide a coating amount of 1.0 g/m² (after drying) and then dried. Further, few drops of a silicone oil (X-41.4003A, mfd. by Shinetsu Silicone K.K.) were dripped onto the back surface by means of a dropping pipette and the dripped silicone oil was spread over the entire surface to effect back surface coating treatment, whereby a thermal transfer film No. 1 was obtained.

Ink Composition for dye layer

Disperse dye 4.0 parts (Kayaset Blue 714, mfd. by Nihon Kayaku K.K.)
Ethyl hydroxycellulose 5.0 parts (mfd. by Hercules Co.)
Methyl ethyl ketone/toluene 80.0 parts (wt. ratio=1/1)
Dioxane 10.0 parts The resultant thermal transfer film was superposed on the receptor layer surface of the image receiving sheet as described above, and printing operation was effected by means of a thermal head under the following conditions, thereby to form a cyan image.

Output: 1 W/dot,
Pulse width (or pulse duration): 0.3 to 0.45 msec.,
Dot density: 3 dots/mm.

The resultant image quality of the thus obtained images of the respective colors was shown in the following Table 1.

TABLE 1

| | Image quality |
|---|---|
| Example A-1 | White dropout or image defect was not observed in the image. Resolution was high. |
| Example A-2 | White dropout or image defect was not observed in the image. Resolution was high. |
| Example A-3 | White dropout or image defect was not observed in the image. Resolution was high. |
| Example A-4 | White dropout or image defect was not observed in the image. Resolution was high. |
| Example A-5 | White dropout or image defect was not observed in the image. Resolution was high. |
| Example A-6 | White dropout or image defect was not observed in the image. Resolution was high. |
| Example A-7 | White dropout or image defect was not observed in the image. Resolution was high. |
| Comparative Example A-1 | White dropout and image defect were observed in the image. Resolution was low. |

Example A-8

A thermal transfer image receiving sheet according to the present invention was prepared in the same manner as in Example A-1, except that a thermal transfer paper (Fax TRW, Bekk smoothness: 147 sec., mfd. by Canon K.K.) was used as the substrate sheet instead of the coated paper used in Example A-1.

Example A-9

A thermal transfer image receiving sheet according to the present invention was prepared in the same manner as in Example A-1, except that a thermal transfer paper (TRW-C2, Bekk smoothness: 800 sec., mfd. by Jujo Seishi K.K.) was used as the substrate sheet instead of the coated paper used in Example A-1.

Example A-10

A thermal transfer image receiving sheet according to the present invention was prepared in the same manner as in Example A-1, except that a thermal transfer paper (Bekk smoothness: 500 sec., mfd. by Jujo Seishi K.K.) was used as the substrate sheet instead of the coated paper used in Example A-1.

Example A-11

A thermal transfer image receiving sheet according to the present invention was prepared in the same manner as in Example A-1, except that a one side coated paper (Bekk smoothness: 1,500 sec. (receptor layer surface), and 50 sec. (back surface) mfd. by Jujo Seishi K.K.) was used as the substrate sheet instead of the coated paper used in Example A-1.

Example A-12

A thermal transfer image receiving sheet according to the present invention was prepared in the same manner as in Example A-1, except that a copy paper (Canon PPC, Bekk smoothness: 42 sec., mfd. by Canon K.K.) was used as the substrate sheet instead of the coated paper used in Example A-1.

Each of the above image receiving sheets of Examples A-8 to A-12 was superposed on the thermal transfer film No. 1 as described above so that the receptor layer of the image receiving sheet contacted the thermal transfer film, and printing operation was effected by means of a thermal head under the following conditions, thereby to form a cyan image.

Output: 1 W/dot,
Pulse width (or pulse duration): 0.3 to 0.45 msec.,
Dot density: 3 dots/mm.

The resultant image quality of the thus obtained images of the respective colors was shown in the following Table 2.

TABLE 2

| Image receiving sheet | Image quality | Texture of sheet |
|---|---|---|
| Example A-8 | White dropout or image defect was not observed in the image. | Texture was good as plain paper. |
| Example A-9 | White dropout or image defect was not observed in the image. | Texture was good as plain paper. |
| Example A-10 | White dropout or image defect was not observed in the image. | Texture was good as plain paper. |
| Example A-11 | White dropout or image defect was not observed in the image. | Texture was good as plain paper. |
| Example A-12 | White dropout or image defect was not observed in the image. | Texture was good as plain paper. |

Example A-13

A coating liquid for a receptor layer having the following composition was applied onto a surface of a 12 µm thick polyester film (trade name: Lumirror, mfd. by Toray K.K.) by means of a bar coater so as to provide s coating amount of 5.0 $g/m^2$ (after drying), and the resultant costing was preliminarily dried by means of a dryer, and then dried in an oven for 30 min. at 100° C., whereby a dye receptor layer was formed.

Thereafter, a solution of an adhesive agent having the following composition was applied onto the above receptor layer so as to provide a coating amount of 1 $g/m^2$ (after drying) and then dried in the same manner as described above, thereby to form an adhesive layer whereby a receptor layer transfer sheet to be used in the present invention was obtained.

Composition of coating liquid for receptor layer

Vinyl chloride/vinyl acetate copolymer 100 parts (VYHD, mfd. by Union Carbide Co.)

Amino modified silicone 3 parts (KS-343, mfd. by Shinetsu Kagaku Kogyo K.K.)

Epoxy modified silicone 3 parts (KF-393, mfd. by Shinetsu Kagaku Kogyo K.K.)

Antistatic agent 2 parts (Prisurf A 208B, mfd. by Daiichi Kogyo Seiyaku)

Methyl ethyl ketone/toluene 500 parts (wt. ratio=1/1)

Composition of coating liquid for adhesive layer

Urethane type adhesive agent 100 parts (A 130, mfd. by Takeda Yakuhin Kogyo K.K.)

Curing agent 30 parts (A 3, mfd. by Takeda Yakuhin Kogyo K.K.)

The receptor layer transfer sheet prepared above was superposed on a surface of copy paper, and the resultant superposition was passed through a laminator to bond these sheets to each other. Then, the substrate film of the receptor layer transfer sheet is peeled from the resultant laminate, thereby to obtain a thermal transfer image receiving sheet according to the present invention.

Example A-14

A thermal transfer image receiving sheet according to the present invention was prepared in the same manner as in Example A-13, except that the antistatic agent used in Example A-13 was added to the adhesive layer.

Example A-15

A thermal transfer image receiving sheet according to the present invention was prepared in the same manner as in Example A-13, except that the antistatic agent used in Example A-13 was applied onto the copy paper.

Example A-16

A thermal transfer image receiving sheet according to the present invention was prepared in the same manner as in Example A-13, except that a coating liquid having the following composition was applied onto the substrate film so as to provide a coating amount of 1 $g/m^2$ based on its solid content, thereby to form a release layer, and the antistatic agent was not added to the dye receptor layer.

Coating liquid for release layer

Polyvinyl alcohol 5 parts (KL 05, mfd. by Nihon Gosei Kagaku)

Antistatic agent 0.1 part (TOF 1240, mfd. by Nihon Yushi)

Pure water 100 parts

In the Example A-13 to A-16 as described above, the peeling state of the substrate film of the receptor layer transfer sheet and the transfer state of the receptor layer were observed.

The thus obtained results are shown in the following Table 3.

TABLE 3

| Image receiving sheet | Peeling noise at the time of peeling | Production in production of image receiving sheet |
|---|---|---|
| Example A-13 | Quite quiet | Stable |
| Example A-14 | Quite quiet | Stable |
| Example A-15 | Quite quiet | Stable |
| Example A-16 | Quite quiet | Stable |

Example A-17

A thermal transfer image receiving sheet according to the present invention was prepared in the same manner as in Example A-4, except that 3 parts of microcapsules (F-30E, mfd. by Matsumoto Yushi Seiyaku) subjected to the foaming operation were used instead of the forming agent used in Example A-4.

Example A-18

A thermal transfer image receiving sheet according to the present invention was prepared in the same manner as in Example A-4, except that 15 parts of titanium coated microcapsules (F-30D/$TiO_2$, mfd. by Matsumoto Yushi Seiyaku) were added instead of the forming agent used in Example A-4.

Example A-19

A coating liquid for a receptor layer having the following composition was applied onto a surface of a 15 µm thick polyester film (trade name: Lumirror, mfd. by Toray K.K.) by means of a bar coater so as to provide a coating amount of 5.0 $g/m^2$ (after drying), and the resultant coating was preliminarily dried by means of a dryer, and then dried in an oven for 30 min. at 100° C., whereby a dye receptor layer was formed.

Thereafter, a solution of an adhesive agent having the following composition was applied onto the above receptor layer so as to provide a coating amount of 1 g/m² (after drying) and then dried in an oven for 30 sec. at 100° C., thereby to form an adhesive layer whereby a receptor layer transfer film to be used in the present invention was obtained. Almost all of heat foaming type microcapsules of the adhesive layer were not foamed at the time.

Composition of coating liquid for receptor layer

Vinyl chloride/vinyl acetate copolymer 100 parts (#1000D, mfd. by Denki Kagaku Kogyo K.K.)

Amino modified silicone 3 parts (X-22-343, mfd. by Shinetsu Kagaku Kogyo K.K.)

Epoxy modified silicone 3 parts (KF-393, mfd. by Shinetsu Kagaku Kogyo K.K.)

Methyl ethyl ketone/toluene 500 parts (wt. ratio=1/1)

Composition of coating liquid for adhesive layer

Urethane type dry laminating agent 100 parts (A-130, mfd. by Takeda Yakuhin Kogyo K.K.)

Curing agent 30 parts (A-3, mfd. by Takeda Yakuhin Kogyo K.K.)

Heat foaming type microcapsule 3 parts (F-30D, mfd. by Matsumoto Yushi Seiyaku K.K.)

Each of the above image receiving sheets of Examples A-17 to A-19 was superposed on the thermal transfer film No. 1 as described above so that the receptor layer of the image receiving sheet contacted the thermal transfer film, and printing operation was effected by means of a thermal head under the following conditions, thereby to form a cyan image.

Output: 1 W/dot,
Pulse width (or pulse duration): 0.3 to 0.45 msec.,
Dot density: 3 dots/mm The resultant image quality of the thus obtained images of the respective colors was shown in the following Table 4.

In Example A-19, the heat foaming type microcapsule was subjected to the foaming operation under heating due to a thermal head at the time of the printing operation.

TABLE 4

| Image receiving sheet | Clarity of image | White dropout in image |
| --- | --- | --- |
| Example A-4 | Receptor layer was white and the image was clear. | White dropout or image defect was not observed in the image. |
| Example A-17 | Receptor layer was white and the image was clear. | White dropout or image defect was not observed in the image. |
| Example A-18 | Receptor layer was white and the image was clear. | White dropout or image defect was not observed in the image. |
| Example A-19 | Receptor layer was white and the image was clear. | White dropout or image defect was not observed in the image. |

EXAMPLE B

Example B-1

A coating liquid having the following composition was applied onto a surface of a 150 μm thick sysnthetic paper (trade name: UPO-FRG-150, mfd. by Oji Yuka K.K.) by means of a bar coater so as to provide a coating amount of 10.0 g/m² (after drying), and the resultant coating was preliminarily dried by means of a dryer, and then dried in an oven for 30 min. at 120° C., whereby a thermal transfer image receiving sheet according to the present invention was obtained.

Composition of coating liquid for receptor layer

Vinyl chloride/acryl/styrene copolymer 10.0 parts (Denkalac #400, mfd. by Denki Kagaku Kogyo K.K.)

Vinyl chloride/vinyl acetate copolymer 10.0 parts (#1000, mfd. by Denki Kagaku Kogyo K.K.)

Vinyl modified silicone 1.2 parts (X-62-1212, mfd. by Shinetsu Kagaku Kogyo K.K.)

Epoxy modified silicone 1.2 parts (X-22-3000T, mfd. by Shinetsu Kagaku Kogyo K.K.)

Catalyst 0.48 part (PL-50T, mfd. by Shinetsu Kagaku Kogyo K.K.)

Potassium titanate whisker 9.0 parts (TISMO-D, mfd. by Otsuka Kagaku K.K.)

Methyl ethyl ketone/toluene 68.12 parts (wt. ratio=1/1)

Example B-2

A thermal transfer image receiving sheet according to the present invention was prepared in the same manner as in Example B-1, except that 9.0 parts of zinc oxide whisker was used instead of the whisker used Example B-1.

Example B-3

A thermal transfer image receiving sheet according to the present invention was prepared in the same manner as in Example B-1, except that 9.0 parts of Potassium titanate whisker surface-treated with an amino type silane coupling agent (TISMO-D101, mfd. by Otsuka Kagaku K.K.) was used instead of the whisker used in Example B-1.

Example B-4

A thermal transfer image receiving sheet according to the present invention was prepared in the same manner as in Example B-1, except that 9.0 parts of potassium titanate whisker of which surface had been subjected to metallizing treatment (WK-300, mfd. by Otsuka Kagaku K.K.) was used instead of the whisker used Example B-1.

Example B-5

A thermal transfer image receiving sheet according to the present invention was prepared in the same manner as in Example B-1, except that a coating liquid for a receptor layer having the following composition was used instead of the coating liquid used in Example B-1.

Composition of coating liquid for receptor layer

Polyester resin 7.2 parts (Bairon 600, mfd. by Toyo Boseki K.K.)

Vinyl chloride/vinyl acetate copolymer 10.8 parts (#1000, mfd. by Denki Kagaku Kogyo K.K.)

Amino modified silicone 0.45 part (X-22-3050C, mfd. by Shinetsu Kagaku Kogyo K.K.)

Epoxy modified silicone 0.45 part (X-22-3000E, mfd. by Shinetsu Kagaku Kogyo K.K.)

Potassium titanate whisker 8.1 parts (TISMO-D, mfd. by Otsuka Kagaku K.K.)

Fluorescent brightening agent 0.09 part (Ubitex OB, mfd. by Ciba Geigy)

Methyl ethyl ketone/toluene 73.0 parts (wt. ratio=1/1)

Comparative Example B-1

A thermal transfer image receiving sheet of Comparative Example was prepared in the same manner as in Example B-1, except that the whisker used in Example B 1 was not used.

Comparative Example B-2

A thermal transfer image receiving sheet of Comparative Example was prepared in the same manner as in Example B-5, except that 10.0 parts of calcium carbonate filler (Hakuenka DD, mfd. by Shiraishi Kogyo K.K.) was used instead of the whisker used in Example B-5.

The surface gloss of each of the above thermal transfer image receiving sheet of Examples and Comparative Examples was evaluated by using a gloss meter, and further the writing property thereof was also evaluated.

The thus obtained results are shown in Table 5 appearing hereinbelow.

On the other hand, a polyester type undercoat layer was formed on one surface of a 6 μm thick polyethylene terephthalate film (trade name: 6 CF 53, mfd. by Toray K.K.) then, an ink composition for a heat resistant lubricating layer having the following composition was applied onto the surface of the undercoating layer by means of a wire bar so as to provide a coating amount of 1.0 g/m² (after drying), and then the resultant coating was dried.

Composition of ink for heat resistant lubricating layer

Polyvinyl butyral resin 2.2 parts (S-LEC BX 1, mfd. by Sekisui Kagaku K.K.)

Toluene 35.4 parts

Methyl ethyl ketone 53.0 parts

Isocyanate 6.8 parts (Banock D-750, mfd. by Dainihon Ink Kagaku Kogyo K.K.)

Phosphoric acid ester 1.6 parts (Prisurf A-208S, mfd. by Daiichi Kogyo Seiyaku K.K.)

Phosphoric acid ester sodium salt 0.6 part (Gafac RD720, mfd. by Toho Kagaku Kogyo K.K.)

Talc 0.4 part (Microace L-1, mfd. by Nihon Talc K.K.)

Amine type catalyst 0.02 part (Desmorapid PP, mfd. by Sumitomo Bayer Urethane K.K.)

The film prepared above was subjected to curing (or hardening) treatment under heating in an oven at 60° C. for three days.

Then, a polyester type undercoat layer was formed on the surface of the film prepared above, which was reverse to that having the above heat resistant lubricating layer. Onto the resultant undercoat layer, an ink composition for forming a dye layer having the following composition was applied by means of a wire bar so as to provide a coating amount of 1.0 g/m², and then dried to form thereon a dye layer, whereby a thermal transfer sheet No. 2 was obtained.

Composition of ink for dye layer

Disperse dye 4.55 parts (Kayaset Blue 714, mfd. by Nihon Kayaku K.K.)

Polyvinyl acetal resin 3.85 parts (S-LEC KS-5, mfd. by Sekisui Kagaku Kogyo K.K.)

Methyl ethyl ketone/toluene 91.6 parts (wt. ratio=1/1)

The thermal transfer sheet No. 2 prepared above was superposed on each of the thermal transfer image receiving sheet of Examples B-1 to B-5 and Comparative Examples B-1 and B-2 so that the dye layer of the thermal transfer sheet contacted the dye receptor layer of the image receiving sheet, and printing operation was effected by means of a thermal head under the following conditions, thereby to form a cyan image.

Output: 0.2 W/dot

Pulse width (or pulse duration): 12 msec.,

Dot density: 6 dots/mm.

The thus obtained cyan images were evaluated with respect to the surface gloss, writing property and toughening of the resultant images. The results are shown in the following Table 5.

Example B-6

A thermal transfer sheet was prepared by using the above ink composition for a dye layer in the same manner as described above except that 0.6 part of potassium titanate whisker (TISMO-D, mfd. by Otsuka Kagaku K.K.) was added to the ink used above.

The thus obtained thermal transfer sheet was subjected to cyan image formation by using the thermal transfer image receiving sheet of Examples B-1 to B-5 and Comparative Examples B-1 and B-2 in the same manner as described above. With respect to the resultant cyan images, the surface gloss, writing property and roughening in the image were evaluated in the same manner as described above. The results are shown in the following Table 6.

TABLE 5

| Image | Surface gloss (%) | Writing property |
| --- | --- | --- |
| Example B-1 | 6.0 | o |
| Example B-2 | 5.8 | o |
| Example B-3 | 6.6 | o |
| Example B-4 | 7.2 | o |
| Example B-5 | 6.4 | o |
| Comparative Example B-1 | 53.9 | x |
| Comparative Example B-2 | 10.9 | o |

TABLE 6

| Image | Surface gloss (%) | Writing property | Dot reproducibility |
| --- | --- | --- | --- |
| Example B-1 | 21.1 | o | o |
| Example B-2 | 21.0 | o | o |
| Example B-3 | 22.3 | o | o |
| Example B-4 | 21.8 | o | o |
| Example B-5 | 23.7 | o | ⊚ |
| Comparative Example B-1 | 50.6 | x | ⊚ |
| Comparative Example B-2 | 28.5 | o | x |

Surface gloss:

Surface gloss based on 45 degree-irradiaton was measured by means of a gloss meter (Digital Gloss Meter U, mfd. by Toyo Seiki Seisakusho K.K.)

Writing property:

○ : Writing property was good when a ball point pen and a pencil were used.

X : Writing property was difficult when a ball-point pen and a pencil were used.

Dot reproducibility

⊚ : White dropout and roughening were very little and good reproducibility was obtained.

○ : White droupout and toughening were little and good reproducibility was obtained.

X : White dropout and toughening were considerable and good reproducibility was not obtained.

EXAMPLE C

Example C-1

Two sheets of 50 μm thick foamed polypropylene (Toyopearl SS, mfd. by Toyobo K.K.) were bonded to both surfaces of a 60 μm thick coated paper (Newtop, mfd. by Kanzaki Seishi K.K., basis weight: 72.3 g/m²) by using an adhesive so that the heat shrinkage directions of the above polypropylene sheets were parallel to each other.

A coating liquid having the following composition was applied onto one side surface of the thus prepared sheet by means of a bar coater so as to provide a coating amount of 5.0 g/m$^2$ (after drying), and the resultant coating was dried by means of a dryer, and then dried in an oven for 10 min. at 80° C., whereby a dye receptor layer was formed.
Composition of coating liquid for receptor layer
  Polyester 4.0 parts (Vylon 600, mfd. by Toyobo K.K.)
  Vinyl chloride/vinyl acetate copolymer 6.0 parts (#1000A, mfd. by Denki Kagaku Kogyo K.K.)
  Amino modified silicone 0.2 part (X-22-3050C, mfd. by Shinetsu Kagaku Kogyo K.K.)
  Epoxy modified silicone 0.2 part (X-22-3000E, mfd. by Shinetsu Kagaku Kogyo K.K.)
  Methyl ethyl ketone/toluene 89.6 parts (wt. ratio=1/1)

Then, a coating liquid having the following composition was applied onto the surface of the above sheet reverse to the receptor layer surface side by means of a bar coater so as to provide a coating amount of 1.0 g/m$^2$ (after drying), and the resultant coating was dried to form a slip layer, whereby a thermal transfer image receiving sheet according to the present invention was obtained.
  Acrylic resin 10 parts
  Teflon filler 5 parts
  (particle size=2 μm)
  Toluene 50 parts
  Methyl ethyl ketone 50 parts

Example C-2

A thermal transfer image receiving sheet according to the present invention was prepared in the same manner as in Example C-1, except that two sheets of 60 μm thick polypropylene type synthetic paper (Upo, mfd. by Oji Yuka K.K.) were bonded to both surfaces of a 75 μm thick polyethylene terephthalate film (Lumirror, mfd. by Toray K.K.) by using an adhesive so that the heat shrinkage directions of the two synthetic paper sheets were parallel to each other.

Example C-3

A thermal transfer image receiving sheet according to the present invention was prepared in the same manner as in Example C-1, except that a sheet of 50 μm thick polypropylene type synthetic paper, (Upo, mfd. by Oji Yuka K.K.) was bonded to one surface side of a 60 μm thick coated paper (Top Coat, mfd. by Kanzaki Seishi K.K., basis weight: 72.3 g/m$^2$ as a core material, and a sheet of 50 μm thick foamed polypropylene (Toyopearl SS, mfd. by Toyobo K.K.) was bonded to the other surface side of the above synthetic paper by using an adhesive so that the heat shrinkage directions of the two sheets of the synthetic paper and foamed polypropylene were parallel to each other.

Example C-4

A thermal transfer image receiving sheet according to the present invention was prepared in the same manner as in Example C-1, except that two sheets of 50 μm thick polyethylene terephthalate type synthetic paper (K1553, mfd. by Toyobo K.K.) were bonded to each other by using an adhesive so that the heat shrinkage directions of the two synthetic paper sheets were parallel to each other.

Comparative Example C-1

A thermal transfer image receiving sheet of Comparative Example was prepared in the same manner as in Example C-1, except that two sheets of foamed polypropylene were bonded so that the heat shrinkage directions of the two foamed polypropylene sheets were at right angles to each other.

Then, a sublimation type thermal transfer sheet for yellow color (mfd. by Dai Nippon Printing K.K.) was superposed on each of the above thermal transfer image receiving sheets of Examples C-1, to C-4 and Comparative Example C-1 so that the dye layer of the thermal transfer sheet contacted the dye receptor layer of the image receiving sheet, and printing operation was effected by supplying printing energy of 90 mJ/mm$^2$ by means of the thermal head of a sublimation type thermal printer (VY-50, mfd. by Hitachi Seisakusho K.K.) from the back surface side of the thermal transfer sheet thereby to form yellow images.

Then, magenta, cyan and black images were sequentially superposed on the resultant yellow images in the same manner as described above, thereby to form full color images.

The thus obtained results are shown in the following Table 7.

TABLE 7

| Image receiving sheet | Dot dropout | Density non uniformity | Curl | Paper feeding property 60° C. | Paper feeding property 0° C. |
| --- | --- | --- | --- | --- | --- |
| Example C-1 | ⊚ | ⊚ | ⊚ | ⊚ | ⊚ |
| Example C-2 | ⊚ | ⊚ | ⊚ | ⊚ | ⊚ |
| Example C-3 | ⊚ | ⊚ | ⊚ | ⊚ | ⊚ |
| Example C-4 | ⊚ | ⊚ | ⊚ | ⊚ | ⊚ |
| Comparative Example C-1 | ⊚ | ⊚ | x | x | x |

⊚: Good
o: Practically no problem
Δ: Somewhat poor
x: Poor

EXAMPLE D

Example D-1

A coating liquid for a receptor layer having the following composition was applied onto a surface of a 12 μm thick polyester film (trade name: Lumirror, mfd. by Toray K.K.) by means of a bar coater so as to provide a coating amount of 5.0 g/m$^2$ (after drying), and the resultant coating was preliminarily dried by means of a dryer, and then dried in an oven for 30 min. at 100° C., whereby a dye receptor layer was formed.

Thereafter, a solution of an adhesive agent having the following composition was applied onto the above receptor layer so as to provide a coating amount of 1 g/m$^2$ (after drying) and then dried in the same manner as described above, thereby to form an adhesive layer whereby a receptor layer transfer film to be used in the present invention was obtained.
Composition of coating liquid for receptor layer
  Vinyl chloride/vinyl acetate copolymer 100 parts (1000GKT, mfd. by Denki Kagaku KogyoK.K.)
  Amino modified silicone 3 parts (X-22-343, mfd. by Shinetsu Kagaku Kogyo K.K.)

Epoxy modified silicone 3 parts (KF-393, mfd. by Shinetsu Kagaku kgyo K.K.)

Methyl ethyl ketone/toluene 500 parts (wt. ratio=1/1)

Composition of coating liquid for adhesive layer

Urethane type dry laminating agent 100 parts (A-130, mfd. by Takeda Yakuhin Kogyo K.K.)

Curing agent 3 parts (A-3, mfd. by Takeda Yakuhin Kogyo K.K.)

The receptor layer transfer film prepared above was susperposed on a surface of PPC paper, and the resultant superposition was passed through a laminator to bond these sheets to each other. Then, the substrate film is peeled from the resultant laminate, thereby to obtain a thermal transfer image receiving sheet according to the present invention.

Example D-2

A thermal transfer image receiving sheet according to the present invention was prepared in the same manenr as in Example D-1, except that coating liquids having the following compositions were used instead of those used in Example D-1, and a thermal transfer paper (TRW 7, mfd. by Jujo Seishi K.K.) was used instead of PPC paper used in Example D-1.

Composition of coating liquid for receptor layer

Vinyl chloride/vinyl acetate copolymer 100 parts (#1000GKT, mfd. by Denki Kagaku Kogyo K.K.)

Amino modified silicone 3 parts (X-22-343, mfd. by Shinetsu Kagaku Kogyo K.K.)

Epoxy modified silicone 3 parts (KF-393, mfd. by Shinetsu Kagaku Kogyo K.K.)

Inorganic pigment (kaolin) 5 parts

Fluorescent brightening agent 0.5 part (Ubitex OB, mfd. by Ciba Geigy)

Methyl ethyl ketone/toluene 500 parts (wt. ratio=1/1)

Composition of coating liquid for adhesive layer

Urethane type dry laminating agent 100 parts (A-130, mfd. by Takeda Yakuhin Kogyo K.K.)

Curing agent 3 parts (A-3, mfd. by Takeda Yakuhin Kogyo K.K.)

Titanium oxide 50 parts

Comparative Example D-1

A thermal transfer image receiving sheet of Comparative Example was prepared in the same manner as in Example D-1, except that a sheet of synthetic paper (Upo, mfd. by Oji Yuka: K.K.) was used as the substrate sheet instead of that used in Example D-1.

Comparative Example D-2

A thermal transfer image receiving sheet of Comparative Example was prepared in the same manenr as in Example D-1, except that laminate of PET/coated paper/PET bonded to each other was used as the substrate sheet instead of that used in Example D-1.

Comparative Example D-3

A thermal transfer image receiving sheet of Comparative Example was prepared in the same manner as in Example D-1 except that laminate of PP/coated paper/PP bonded to each other was used as the substrate sheet instead of that used in Example D-1.

The tear strengths of the thermal transfer image receiving sheet prepared above were measured according to JIS P 8116. In this measurement, an initial cut was not made in the image receiving sheet to be measured, and the touch or feeling obtained in a case where each of the image receiving sheets was actually torn by hands was evaluated. The thus obtained results are shown in the following Table

TABLE 8

| Image receiving sheet | Tear strength (g) | Touch in tearing |
|---|---|---|
| Example D-1 | 45 | o |
| Example D-2 | 38 | o |
| Comparative Example D-1 | Measurement was impossible | x |
| Comparative Example D-2 | Measurement was impossible | x |
| Comparative Example D-3 | 230 | Δ | o: Good, Δ: Difficult to be torn
x: Impossible to be torn

The rigidity of each of the image receiving sheets of Examples D-1 and D-2 and Comparative Examples D-2 and D-3 was measured according to JIS P 8143 and further the touch or feeling obtained in a case where each of these image receiving sheets was actually folded by hand was evaluated. The thus obtained results are shown in the following Table 9.

TABLE 9

| Image receiving sheet | Rigidity ($m^3$) | Adaptability to folding |
|---|---|---|
| Example D-1 | 45 | The sheet was easy to be folded and could be formed into a relatively thin superposition by folding thereof. |
| Example D-2 | 40 | The sheet was easy to be folded and could be formed into a relatively thin superposition by folding thereof. |
| Comparative Example D-2 | 150 | The sheet was difficult to be folded and was bulky when subjected to filing. |
| Comparative Example D-3 | 105 | The sheet was difficult to be folded and was bulky when subjected to filing. |

The thermal transfer film No. 1 which was the same as that used in the above Example A was superposed on the receptor layer surface of the image receiving sheet as described above, and printing operation was effected by means of a thermal head under the following conditions, thereby to form a cyan image.

Output: 1 W/dot,

Pulse width (or pulse duration): 0.3 to 0.45 msec.,

Dot density: 3 dots/mm.

The resultant image quality of each of the thus obtained images was good.

EXAMPLE E

Example E-1

10 parts of unsaturated polyester resin and 10 parts of pentaerythritol triacrylate were added to and mixed with a compound for synthetic paper comprising polypropylene resin and inorganic filler with respect to 100 parts of the polypropylene resin. The resultant compound was formed into a 150 μm thick film of porous synthetic paper having a three layer structure according to an ordinary process. The thus obtained synthetic paper was irradiated with an electron beam under conditions of an accelerating voltage of 175 KeV and an irradiation dose of 3 Mrad by a low energy electrocurtain method, thereby to obtain a heat resistant synthetic paper.

The surface of the above heat resistant synthetic paper was subjected to corona discharge treatment. Then, a coating liquid for a receptor layer having the following composition was applied onto the resultant surface of the heat resistant synthetic paper by means of a bar coater so as to provide a coating amount of 5.0 g/m² (after drying), and the resultant coating was preliminarily dried by means of a dryer, and then dried in an oven for 30 min. at 100° C., to form a dye receptor layer whereby a thermal transfer image receiving sheet according to the present invention was prepared.
Composition of coating liquid for receptor layer
Vinyl chloride/vinyl acetate copolymer 100 parts (#1000D, mfd. by Denki Kagaku Kogyo K.K.)
Amino modified silicone 3 parts (X-22-343, mfd. by Shinetsu Kagaku Kogyo K.K.)
Epoxy modified silicone 3 parts (KF-393, mfd. by Shinetsu Kagaku Kogyo K.K.)
Methyl ethyl ketone/toluene 500 parts (wt. ratio=1/1)

Example E-2

A heat resistant synthetic paper was prepared in the same manner as in Example E-1 (inclusive of electron beam irradiation) except that 15 parts of polybutadiene dimethacrylate was used as a crosslinking component instead of that used in Example E-1.

Further, a thermal transfer image receiving sheet according to the present invention was prepared in the same manner as in Example E-1 except that a dye receptor layer was formed on the heat resistant synthetic paper prepared above.

Example E-3

A 50% methyl ethyl ketone solution of divinylbenzene was applied onto a 150 µm thick commercially available sysnthetic paper (Upo, FRG 150, mfd. by Oji Yuka K.K.) so as to provide a coating amount of a 10 g/m² (wet), and the resultant coating was left standing for 2 hours at 50° C. so that the divinylbenzene was absorbed in and retained by the synthetic paper, and the solvent was evaporated.

Then, a heat resistant synthetic paper was prepared in the same manner as in Example E-1 (inclusive of electron beam irradiation) except that the thus treated synthetic paper was used instead of that used in Example E-1.

Further, a thermal transfer image receiving sheet according to the present invention was prepared in the same manner as in Example E-1 except that a dye receptor layer was formed on the heat resistant synthetic paper prepared above.

Example E-4

A 50% toluene solution of methyl ethyl ketone peroxide was applied onto a 150 µm thick commercially available synthetic paper (Upo, FRG 150, mfd. by Oji Yuka K.K.) so as to provide a coating amount of a 15 g/m² (wet), and the resultant coating was left standing for 1 hour at 60° C. so that the peroxide was absorbed in and retained by the synthetic paper, and the solvent was evaporated.

Then, a heat resistant synthetic paper was prepared in the same manner as in Example E-1 (inclusive of electron beam irradiation) except that the thus treated synthetic paper was used instead of that used in Example E-1.

Further, a thermal transfer image receiving sheet according to the present invention was prepared in the same manner as in Example E-1 except that a dye receptor layer was formed on the heat resistant synthetic paper prepared above.

Comparative Example E-1

Further, a thermal transfer image receiving sheet of Comparative Example was prepared in the same manner as in Example E 1 except that a synthetic paper (Upo FRG 150, mfd. by Oji Yuka K.K.) was used as a substrate.

On the other hand, a thermal transfer film No. 1 which was the same as that used in the above Example A superposed on the receptor layer surface of the image receiving sheet as described above, and printing operation was effected by means of a thermal head under the following conditions, thereby to form a cyan image.
Output: 1 W/dot,
Pulse width (or pulse duration): 0.3 to 0.45 msec.,
Dot density: 3 dots/mm.

The resultant heat resistance of each of the thus obtained images and the resultant heat resistance of each of the substrate sheets were evaluated. The thus obtained results are shown in the following Table 10.

TABLE 10

| Image receiving sheet | Heat resistance of substrate | | Heat resistance of image | |
|---|---|---|---|---|
| | 120° C., 10 min. | 150° C., 5 min. | 120° C., 10 min. | 150° C., 5 min. |
| Example E-1 | ⊚ | ⊚ | ⊚ | ⊚ |
| Example E-2 | ⊚ | ⊚ | ⊚ | ⊚ |
| Example E-3 | ⊚ | o | ⊚ | o |
| Example E-4 | o | Δ–o | ⊚ | o |
| Comparative Example E-1 | Δ | x | Δ–o | x |

⊚: None of curl, shrinkage, unevenness, etc. did not occur.
o: None of shrinkage and unevenness did not occur, but curl was somewhat observed.
Δ: All of curl, shrinkage and unevenness occurred.
x: Shrinkage and melting occurred and the original shape was considerably deformed.

EXAMPLE F

Example F-1

A 150 µm thick synthetic paper (Upo FRG 150, mfd. by Oji Yuka K.K.) was used as a subs/rate sheet. A coating liquid having the following composition was applied onto one surface side of the above synthetic paper by means of a bar coater so as to provide a coating amount of 3.0 g/m² (after drying), and the resultant coating was preliminarily dried by means of a dryer, and then dried in an oven for 30 min. at 100° C., whereby a thermal transfer image receiving sheet was prepared.
Composition of coating liquid for receptor layer
Polyester 100 parts (Vylon 600, mfd. by Toyo Boseki K.K.)
Amino modified silicone 2 parts (KF-393, mfd. by Shinetsu Kagaku Kogyo K.K.)

Epoxy modified silicone 2 parts (X-22-343, mfd. by Shinetsu Kagaku Kogyo K.K.)

Methyl ethyl ketone/toluene 400 parts (wt. ratio=1/1)

Copy paper was superposed onto the dye receptor layer surface of the image receiving sheet prepared above, the resultant superposition was subjected to lamination by using a laminator (H-200, mfd. by Meiko Shokai K.K.) heated up to 120° C., and then the copy paper was peeled from the resultant laminate, thereby to obtain a thermal transfer image receiving sheet according to the present invention having a surface glossiness of 7%.

The image receiving sheet prepared above was cut into a predetermined size, loaded to a video printer (Video Printer VY-100, mfd. by Hitachi Seisakusho K.K.), and subjected to a photographic image formation by using a sublimation type thermal transfer method. As a result, a matted image having a texture similar to that of paper was obtained.

Example F-2

A thermal transfer image receiving sheet according to the present invention having a surface glossiness of 12% was prepared in the same manner as in Example F-1 except that an image receiving sheet before the surface treatment used in Example F-1 was passed between an embossing roller heated up to 120° C. and a nip roller.

The image receiving sheet prepared above was cut into a predetermined size, loaded to a video printer (Video Printer VY 100, mfd. by Hitachi Seisakusho K.K.), and subjected to a photographic image formation by using a sublimation type thermal transfer method. As a result, a matted image similar to a matted photograph was obtained.

Example F-3

A thermal transfer image receiving sheet according to the present invention having a surface glossiness of 28% was prepared in the same manenr as in Example F-1 except that a matted PET (trade name: X-42, mfd. by Toray K.K.) was used as a shaping sheet instead of that used in Example F-1.

The image receiving sheet prepared above was cut into a predetermined size, loaded to a video printer (Video Printer VY 100, mfd. by Hitachi Seisakusho K.K.), and subjected to photographic image formation by using a sublimation type thermal teransfer method. As a result, a matted image similar to a matted photograph was obtained.

Comparative Example F-1

The image receiving sheet before the surface treatment used in Example F-1 showed a surface glossiness of 35.1% An image was formed in the same manner as in Example F-1 except for using the above image receiving sheet before the surface treatment. As a result, the thus obtained images had a high gloss and were sometimes difficult to be observed depending on the angle of observation to be used therefor.

Comparative Example F-2

The image obtained in Comparative Example F-1 was subjected to the surface embossing treatment in the same manner as in Example F-2. As a result, image blurring was observed in the thin line portion of the resultant image.

EXAMPLE G

Example G-1

A 150 μm thick synthetic paper (Upo FRG 150, mfd. by Oji Yuka K.K.) was used as a substrate sheet. A coating liquid having the following composition was applied onto one surface side of the above synthetic paper by means of a bar coater so as to provide a coating amount of 8.0 g/m$^2$ (after drying), and the resultant coating was preliminarily dried by means of a dryer, and then dried in an oven for 30 min. at 100° C., whereby a thermal transfer image receiving sheet according to the present invention was prepared.

Composition of coating liquid for receptor layer

Polyester 40 parts (Vylon 600, mfd. by Toyo Boseki K.K.)

Vinyl chloride/vinyl acetate copolymer 60 parts (#1000A, mfd. by Denki Kagaku Kogyo K.K.)

Amino modified silicone 4 parts (KF-393, mfd. by Shinetsu Kagaku Kogyo K.K.)

Epoxy modified silicone 4 parts (KS-343, mfd. by Shinetsu Kagaku Kogyo K.K.)

Methyl ethyl ketone/toluene 400 parts (wt. ratio=1/1)

The image receiving sheet prepared above was loaded to sublimation type thermal transfer printer (Video Priner VY-100, mfd. by Hitachi Seisakusho K.K.), and subjected to a full color gradation image formation. As a result, problem of peeling property between the image receiving sheet and the thermal transfer sheet did not occur.

Then, character information was printed on a margin portion of the image receiving sheet as described above by means of a wax type thermal transfer printer (AP-860, mfd. by Epson K.K.). As a result, the transferability of the printed character was good and the adhesion property thereof posed no problem.

Further, a character image was formed in a similar margin portion by copying by means of an electrophotograhic copying machine (Xerox 5039). As a result, the adhesion property of the toner used for such a purpose posed no problem.

Example G-2

An image receiving sheet was prepared and subjected to gradation image formation and non gradation image formation in the same manner as in Example G-1 except for using the following coating liquid instead of that used in Example G-1. As a result, good results were similarly obtained.

Composition of coating liquid for receptor layer

Polyester 40 parts (Vylon 600, mfd. by Toyo Boseki K.K.)

Vinyl chloride/vinyl acetate copolymer 60 parts (#1000A, mfd. by Denki Kagaku Kogyo K.K.)

Amino modified silicone 4 parts (KF-393, mfd. by Shinetsu Kagaku Kogyo K.K.)

Epoxy modified silicone 4 parts (KS- 343, mfd. by Shinetsu Kagaku Kogyo K.K.)

Fluorescent brightening agent 0.5 part (Ubitex OB, mfd. by Ciba Geigy)

Methyl ethyl ketone/toluene 400 parts (wt. ratio=1/1)

Comparative Example G-1

An image receiving sheet was prepared and subjected to gradation image format ion and non gradation image formation in the same manner as in Example G-1 except for using the following coating liquid instead of that used in Example G-1.

As a result, the resultant adhesion property of the images based on the wax ink and toner used for such a purpose was poor and these images were easily peeled.

Composition of coating liquid for receptor layer

Polyester 40 parts (Vylon 600, mfd. by Toyo Boseki K.K.)
Vinyl chloride/vinyl acetate copolymer 60 parts (#1000A, mfd. by Denki Kagaku Kogyo K.K.)
Amino modified silicone 16 parts (KF-393, mfd. by Shinetsu Kagaku Kogyo K.K.)
Epoxy modified silicone 16 parts (KS-343, mfd. by Shinetsu Kagaku Kogyo K.K.)
Methyl ethyl ketone/toluene 400 parts (wt. ratio=1/1)

EXAMPLE H

Various coating liquids to be used for the preparation of an image receiving sheet were prepared according to the following formulations.

Coating liquid A-1 for adhesive

Polyester polyol 15.00 parts (Adcoat, mfd. by Toyo Morton K.K. )
Dye (1) 0.15 part
Methyl ethyl ketone 59.85 parts
Dioxane 25.00 parts Coating liquid A-2 for adhesive Polyester polyol 15.00 parts (Adcoat, mfd. by Toyo Morton K.K. )
Methyl ethyl ketone 59.85 parts
Dioxane 25.00 parts Coating liquid B-1 for back coating layer Acrylic resin 10.0 parts (BR-85, mfd. by Mitsubishi Rayon K.K.)
Organic fine particles 0.1 part (Orgasol 2002D, mfd. by Nihon Rirusan K.K. )
Dye (2) 0.1 part
Toluene 40.0 parts
Methyl ethyl ketone 49.8 parts Coating liquid B-2 for back coating layer Acrylic resin 10.0 parts (BR-85, mfd. by Mitsubishi Rayon K.K.)
Organic fine particles 0.1 part (Orgasol 2002D, mfd. by Nihon Rirusan K.K.)
Toluene 40.0 parts
Methyl ethyl ketone 49.8 parts Coating liquid C-1 for dye receptor layer Polyester 4.0 parts (Vylon 600, mfd. by Toyo Boseki K.K.)
Vinyl chloride/vinyl acetate copolymer 6.0 parts (#1000A, mfd. by Denki Kagaku Kogyo K.K.)
Dye (3) 0.02 part
Amino modified silicone 0.2 part (X-22-3050C, mfd. by Shinetsu Kagaku Kogyo K.K.)
Epoxy modified silicone 0.2 parts (X-22-3000E, mfd. by Shinetsu Kagaku Kogyo K.K.)
Toluene 45.0 parts
Methyl ethyl ketone 44.58 parts Coating liquid C-2 for dye receptor layer Polyester 4.0 parts (Vylon 600, mfd. by Toyo Boseki K.K.)
Vinyl chloride/vinyl acetate copolymer 6.0 parts (#1000A, mfd. by Denki Kagaku Kogyo K.K.)
Amino modified silicone 0.2 part (X-22-3050C, mfd. by Shinetsu Kagaku Kogyo K.K.)
Epoxy modified silicone 0.2 part (X-22-3000E, mfd. by Shinetsu Kagaku Kogyo K.K.)
Toluene 45.0 parts
Methyl ethyl ketone 44.58 parts Thermal transfer image receiving sheets of Examples (H-1 to (H-4) according to the present invention were prepared by using the above coating liquids in the following manner.

Example H-1

The coating liquid A-1 for adhesive was applied onto one surface side of a 100 μm thick transparent polyethylene terephthalate film (T-100, mfd. by Toray K.K.) as a substrate sheet so as to provide a thickness (after drying) of 1 μm and then dried. Then, the coating liquid B-2 for back coating layer was applied onto the surface of the resultant layer so as to provide a thickness (after drying) of 1 μm and then dried. Then, the coating liquid C-2 for dye receptor layer was applied onto the surface of the above transparent sheet opposite to that for the adhesive layer so as to provide a thickness (after drying) of 5 μm and then dried, whereby a thermal transfer image receiving sheet according to the present invention was prepared.

Example H-2

A transparent type thermal transfer image receiving sheet according to the present invention was prepared in the same manner as in Example H-1 except for using the coating liquid A-2, B-1 and C-2 instead of those used in Example H-1.

Example H-3

A transparent type thermal transfer image receiving sheet according to the present invention was prepared in the same manner as in Example H-1 except for using the coating liquids A-2, B-2 and C-1 instead of those used in Example H-1.

Example H-4

0.03 part of the dye (4) was added to 100 parts of polyethylene terephthalate and mixed therewith under heating at 290° C. The resultant mixture was formed into a non stretched film according to an ordinary process. The thus obtained film was stretched in the longitudinal direction and lateral direction thereof, and then the resultant film was subjected to heat fixing at 220 thereby to obtain a 100 μm thick colored polyester film.

By use of the resultant polyester film, a transparent type thermal transfer image receiving sheet according to the present invention was prepared in the same manner as in Example H-1 except for using the coating liquids A-2, B-2 and C-2 instead of those used in Example H-1.

Comparative Example H-1

A transparent type thermal transfer image receiving sheet of Comparative Example was prepared in the same manner as in Example H-1 except for using, the coating liquids A-2, B-2 and C-2 instead of those used in Example H-1.

Evaluation Example 1

The thermal transfer image receiving sheets of Examples H-1 to H-4 and Comparative Example H-1 prepared above were subjected to chromaticity value measurement, a heat deterioration test and a photodeterioration test. The results are shown in the following Table 11.

TABLE 11

| Image receiving | Chromaticity | | Heat | Photo |
|---|---|---|---|---|
| sheet | x | y | deterioration | deterioration |
| Example H-1 | 0.284 | 0.301 | o | o |
| Example H-2 | 0.280 | 0.295 | o | o |
| Example H-3 | 0.305 | 0.310 | o | o |
| Example H-4 | 0.293 | 0.307 | o | o |
| Comparative Example H-1 | 0.315 | 0.321 | x | x |

Chromaticity:

A transmission spectrum of the sample was measured by means of a spectrophotometer UV-3100(mfd. by Shimazu Seisakusho) and the resultant data was represented by values of x and y according to the standard colorimetric system CIE 1931.

Heat deterioration:

The sample was left standing in an environment of 70° C. for 300 hours, and the change in color before and after the above test was observed with naked eyes.

O : Yellowing was little observed

X : Yellowing was clearly observed.

Photo deterioration:

The sample was irradiated by means of a xenon fadeometer so as to provide a total irradiation energy of 70 KJ/m$^2$, and the change in color before and after the above test was observed with naked eyes.

O : Yellowing was little observed

X : Yellowing was clearly observed.

Evaluation Example 2

A sublimation type thermal transfer sheet for a yellow color (mfd. by Dai Nippon Printing K.K.) was superposed on each of the thermal transfer image receiving sheet of Examples H-1 to H-4 and Comparative Example H-1 (as samples before and after the deterioration text) so that the dye layer of the thermal transfer sheet contacted the dye receptor layer of the image receiving sheet, and a printing energy of 90 mJ/mm$^2$ was applied to the thermal transfer sheet from the back surface thereof by means of a thermal head of a sublimation type thermal transfer printer (VY-100, mfd. by Hitachi Seisakusho K.K.), thereby to effect printing for a yellow color. Then, printing operations for magenta and cyan colors were subsequently effected, whereby full color images were obtained. These images were observed on a Schaukasten. The thus obtained results are shown in the following Table 12.

TABLE 12

| Image receiving sheet | Before deterioration test | | After deterioration test | |
|---|---|---|---|---|
| | Color definition | Visibility | Color definition | Visibility |
| Example H-1 | o | o | o | o |
| Example H-2 | o | o | o | o |
| Example H-3 | o | o | o | o |
| Example H-4 | o | o | o | o |
| Comparative Example H-1 | o | o~Δ | Δ~x | Δ~x | o: Good, Δ: Somewhat poor, x: Poor

EXAMPLE I

Various coating liquids to be used for the preparation of an image receiving sheet were prepared according to the following formulations.

Coating liquid A-1 for bubble containing layer

Polyester 100 parts (Vylon 600, mfd. by Toyo Boseki K.K.)

Heat forming type microcapsule 10 parts (F-80, mfd. by Matsumoto Yushi Seiyaku K.K.)

Ethyl acetate/isopropyl alcohol 400 parts (wt. ratio=1/1)

Coating liquid A-2 for bubble containing layer

Polyester 100 parts (Vylon 600, mfd. by Toyo Boseki K.K.)

Heat foaming type microcapsule 10 parts (F-80, mfd. by Matsumoto Yushi Seiyaku K.K.)

Ethyl acetate/isopropyl alcohol 400 parts (wt. ratio=1/1)

Titanium oxide 50 parts (TCA-888, mfd. by Tochem Product K.K.)

Coating liquid A-3 for bubble containing layer

Acrylic type emulsion 100 parts (E-1000, mfd. by Souken Kagaku K.K.)

Heat foaming type microcapsule 30 parts (F-30, mfd. by Matsumoto Yushi Seiyaku K.K.)

Pure water 50 parts

Coating liquid B-1 for intermediate layer

Acryl resin 100 parts (BR-88, mfd. by Sekisui Kagaku K.K.)

Toluene/methyl ethyl ketone 400 parts (wt. ratio=1/1)

Coating liquid B-2 for intermediate layer

Acryl resin 100 parts (BR-88, mfd. by Sekisui Kagaku K.K.)

Toluene/methyl ethyl ketone 400 parts (wt. ratio=1/1)

Titanium oxide 50 parts (TCA-888, mfd. by Tochem Product K.K.)

Coating liquid C for dye receptor layer

Vinyl chloride/vinyl acetate copolymer 100 parts (#1000D, mfd. by Denki Kagaku Kogyo K.K.)

Amino modified silicone 3 parts (X-22-343, mfd. by Shinetsu Kagaku Kogyo K.K.)

Epoxy modified silicone 3 parts (KF-393, mfd. by Shinetsu Kagaku Kogyo K.K.)

Methyl ethyl ketone/toluene 500 parts (wt. ratio=1/1)

Thermal transfer image receiving sheets of Examples (I-1) to (I-5) according to the present invention were prepared by using the above coating liquids in the following manner.

Example I-1

The coating liquid A-2 for bubble containing layer was applied onto one surface side of a 90 μm thick cast coated paper (Mirror-coat-gold, mfd. by Kanzaki Seishi K.K.) as a substrate sheet so as to provide a thickness (after drying) of 15 μm and then dried. Then, the coating liquid C for dye receptor layer was applied onto the surface of the above bubble containing layer so as to provide a thickness (after drying) of 3 μm and then dried, whereby a thermal transfer image receiving sheet according to the present invention was prepared.

Example I-2

The coating liquid A-1 for bubble containing layer was applied onto one surface side of a 90 μm thick cast coat paper (Mirror-coat-gold, mfd. by Kanzaki Seichi K.K.) as a substrate sheet so as to provide a thickness (after drying) of 15 μm and then dried. Then, the coating liquid B-1 for intermediate layer was applied onto the above bubble containing layer so as to provide a thickness (after drying) of 3 μm and then dried. Then, the coating liquid C for dye receptor layer was applied onto the surface of the above intermediate layer so as to provide a thickness (after drying) of 3 μm and then dried, whereby a thermal transfer image receiving sheet according to the present invention was prepared.

Example I-3

A thermal transfer image receiving sheet according to the present invention was prepared in the same manner as in Example I-2 except for using the coating liquid A-1, B-2 and C instead of those used in Example I-2.

Example I-4

A thermal transfer image receiving sheet according to the present invention was prepared in the same manner as in Example I-2 except for using the coating liquids A-2, B-2 and C instead of those used in Example I-2.

Example I-5

The coating liquid C for dye receptor layer was applied onto a surface of a 12 μm thick polyester film (trade name: Lumirror, mfd. by Toray K.K.) so as to provide a thickness (after drying) of 3 μm and then dried. The coating liquid B-1 for intermediate layer was applied onto the surface of the above dye receptor layer so as to provide a thickness (after arying) of 15 μm and then dried. Then, the coating liquid A-3 for bubble containing layer was applied onto the surface of the above intermediate layer so as to provide a thickness (after drying) of 25 μm and then dried, whereby a receptor layer transfer film to be used in the present invention was obtained.

The receptor layer transfer film prepared above was superposed on a cast surface of a 90 μm think cast coated paper (Mirror-coat-gold, mfd. by Kanzaki Seishi K.K.), and the resultant superposition was passed through a laminator to bond these sheets to each other. Then, the substrate film of the receptor layer transfer film is peeled from the resultant laminate, thereby to obtain a thermal transfer image receiving sheet according to the present invention.

Comparative Example I-1

A thermal transfer image receiving sheet of Comparative Example was prepared in the same manner as in Example I-1 except that the coating liquid C for dye receptor layer was directly applied onto the surface of the cast coat paper and dried.

Comparative Example I-2

A thermal transfer image receiving sheet of Comparative Example was prepared in the same manner as in Example I-1 except for using the coating liquids A-1 and C instead of those used in Example I-1.

The thermal transfer film No. 1 which was the same as that used in the above Example A was superposed on each of the thermal transfer image receiving sheet of Examples I-1 to I-5 and Comparative Example I-1 and I-2 so that the dye layer of the thermal transfer film contacted the dye receptor layer of the image receiving sheet, and printing operation was effected by means of a thermal head under the following conditions, thereby to form a cyan image.

Output: 0.2 W/dot
Pulse width (or pulse duration): 12 msec.,
Dot density: 6 dots/mm.

The thus obtained cyan images were evaluated with respect to the surface strength and quality of the resultant images. The results are shown in the following Table 13.

TABLE 13

| Image receiving sheet | Surface strength | Image quality |
|---|---|---|
| Example I-1 | o | White dropout or image defect was not observed in the image. |
| Example I-2 | o | White dropout or image defect was not observed in the image. |
| Example I-3 | o | White dropout or image defect was not observed in the image. |
| Example I-4 | o | White dropout or image defect was not observed in the image. |
| Example I-5 | o | White dropout or image defect was not observed in the image. |
| Comparative Example I-1 | Δ | White dropout and image defect were observed in the image. |
| Comparative Example I-2 | x | White dropout or image defect was not observed in the image. |

Surface strength
Surface strength was evaluated by writing test with mechanical pencil (lead: HB).
O : Writing property was good
Δ : Density of written letters was low
X : Dye receptor layer was scooped away by lead

EXAMPLE J

Example J-1

An ink for a dye layer having the following comoposition was prepared and applied onto a 6 μm thick polyethylene terephthalate film as a substrate film of which back surface (i.e., a surface disposed reverse to the surface on which the dye layer was to be formed) had been subjected to heat resistance imparting treatment, by a gravure printing method so as to provide a thickness of 1.0 g/m$^2$ (after drying) and then dried. Further, the film was heat-treated at 100° C. for 2 min., thereby to prepare a thermal transfer sheet in a continuous film form according to the present invention.
Ink composition for dye layer
 Kayaset blue 714 4 parts (mfd. by Nihon Kayaku K.K., C.I. Solvent Blue 63)
 Ethyl hydroxycellulose 5 parts (mfd. by Hercules Co.)
 Microcapsules *1 0.4 part (G-902, mfd. by Matsumoto Yushi Seiyaku K.K.)
 Toluene/isopropyl alcohol 80 parts (wt. ratio=1/1)
 (*1: Non foaming type microcapsules)

Example J-2

A thermal transfer sheet according to the present invention was prepared in the same manner as in Example J-1 except that 0.4 part of Microcapsules F-30GS (mfd. by Matsumoto Yushi K.K.) were used instead of the microcapsules used in Example J-1.

Example J-3

A thermal transfer sheet according to the present invention was prepared in the same manner as in Example J-1 except that 0.4 part of decomposition foaming type microcapsules Cellmike AN (mfd. by Sankyo Kasei K.K.) were used instead of the microcapsules used in Example J-1.

Example J-4

A thermal transfer sheet according to the present invention was prepared in the same manner as in Example J-1 except that an ink composition for an intermediate layer having the following composition was applied onto the substrate film so as to provide a coating amount of 0.5 g/m² based on solid content and then dried, and the dye layer was formed on the thus formed intermediate layer.
Ink composition for intermediate layer
  Ethyl hydroxycellulose 5 parts (mfd. by Hercules Co.)
  Microcapsules *1 0.4 part (G-902, mfd. by Matsumoto Yushi Seiyaku K.K.)
  Toluene/isopropyl alcohol 80 parts (wt. ratio=1/1)
  (*1: Non foaming type microcapsules)

Comparative Example J-1

A thermal transfer sheet of Comparative Example was prepared in the same manner as in Example J-1 except that the foaming agent was not used.

Reference Example J-1

A post card paper was used as a substrate for an image receiving sheet, and a coating liquid for an receptor layer having the following composition was applied onto one surface side of the substrate so as to provide a coating amount of 4.5 g/m² (after drying) and then dried at 100° C. for 30 min., thereby to obtain an image receiving sheet.
Composition of coating liquid for receptor layer
  Polyester resin 100 parts (Vylon 103 mfd. by Toyo Boseki K.K.)
  Amino modified silicone oil 3 parts (X-22-343, mfd. by Shinetsu Kagaku Kogyo K.K.)
  Epoxy modified silicone oil 3 parts (KF-393, mfd. by Shinetsu Kagaku Kogyo K.K.)
  Methyl ethyl ketone/toluene 500 parts (wt. ratio=1/1)

Reference Example J-2

Copy paper was superposed onto the dye receptor layer surface of the image receiving sheet prepared above, the resultant superposition was subjected to lamination by using a laminator (H-200, mfd. by Meiko Shokai K.K.) heated up to 120° C., and then the copy paper was peeled from the resultant laminate, thereby to obtain a thermal transfer image receiving sheet having a matted surface.
Thermal transfer test
  Each of the thermal transfer sheets of Examples and Comparative Examples prepared above was superposed on the thermal transfer image receiving sheet prepared above according to combinations as described in the following Table 14 so that the dye layer of the thermal transfer sheet contacted the dye receptor layer of the image receiving sheet, and thermal head recording was effected by applying heat to the thermal transfer sheet from the back surface thereof by means of a thermal head (KMT-85-6, MPD2) under the following conditions:
  Voltage applied to the head: 12.0 V
  Width of applied pulse: step pattern wherein the pulse width was sequentially decreased from msec/line in decrement of 1 msec.
  Sub scan direction: 6 line/mm (33.3 msec/line)
The thus obtained results are shown in the following Table 14.

TABLE 14

| Thermal transfer sheet | Image receiving sheet | Image quality |
|---|---|---|
| Example J-1 | Reference Example J-1 | o |
| Example J-1 | Reference Example J-2 | o |
| Example J-2 | Reference Example J-1 | o |
| Example J-2 | Reference Example J-2 | o |
| Example J-3 | Reference Example J-1 | o |
| Example J-3 | Reference Example J-2 | o |
| Example J-4 | Reference Example J-1 | o |
| Example J-4 | Reference Example J-2 | o |
| Comparative Example J-1 | Reference Example J-1 | Δ |
| Comparative Example J-1 | Reference Example J-2 | x | o: White dropout or image defect was not observed in the image.
Δ: White dropout and image defect were partially observed in the image.
x: White dropout and image defect were considerably observed in the image.

What is claimed is:
1. A thermal transfer image receiving sheet comprising a substrate sheet, a cushion layer disposed on at least one surface side of the substrate sheet and a dye receptor layer disposed on the cushion layer, wherein said dye receptor layer contains substantially no filler and has a surface glossiness of 30% or below and said cushion layer contains a foaming agent.

2. A thermal transfer image receiving sheet according to claim 1 which has been formed by pressing a medium having unevenness onto the surface for the dye receptor layer so as to provide a surface glossiness of 30% or below.

3. A thermal transfer image receiving sheet according to claim 1, wherein a receptor layer transfer film composed of a substrate film and the dye receptor layer peelable from the substrate film is bonded to the substrate sheet forming a laminate in a condition that the receptor layer transfer film is superposed onto the cushion layer formed on at least one surface side of the substrate sheet and the dye receptor layer is formed on the substrate sheet through the cushion layer by peeling off the substrate film from the laminate.

4. A thermal transfer image receiving sheet comprising a substrate sheet, a cushion layer disposed on at least one surface side of the substrate sheet and a dye receptor layer disposed on the cushion layer, wherein said dye receptor layer contains substantially no filler and has a surface glossiness of 30% or below and said cushion layer contains a foaming material.

5. A thermal transfer image receiving sheet according to claim 4 which has been formed by pressing a medium having unevenness onto the surface of the dye receptor layer so as to provide a surface glossiness of 30% or below.

6. A thermal transfer image receiving sheet according to claim 4, wherein a receptor layer transfer film composed of a substrate film and the dye receptor layer peelable from the substrate film is bonded to the substrate sheet forming a laminate in a condition that the receptor layer transfer film is superposed onto the cushion layer formed on at least one surface side of the substrate sheet and the dye receptor layer is formed on the substrate sheet through the cushion layer by peeling off the substrate film from the laminate.

* * * * *